US012198517B1

(12) United States Patent
Alameh et al.

(10) Patent No.: US 12,198,517 B1
(45) Date of Patent: Jan. 14, 2025

(54) DEVICES AND TECHNIQUES FOR DEACTIVATING TAGS

(71) Applicant: Amazon Technologies, Inc., Seattle, WA (US)

(72) Inventors: Rachid M Alameh, Crystal Lake, IL (US); Jason Thomas Roberts Hart, Bolton, MA (US)

(73) Assignee: Amazon Technologies, Inc., WA (US)

( * ) Notice: Subject to any disclaimer, the term of this patent is extended or adjusted under 35 U.S.C. 154(b) by 0 days.

(21) Appl. No.: 17/179,876

(22) Filed: Feb. 19, 2021

(51) Int. Cl.
*G08B 13/24* (2006.01)

(52) U.S. Cl.
CPC ....... *G08B 13/242* (2013.01); *G08B 13/2428* (2013.01); *G08B 13/2471* (2013.01); *G08B 13/2482* (2013.01)

(58) Field of Classification Search
CPC .. G07G 3/003; G08B 13/242; G08B 13/2457; G08B 13/248; G06K 19/07345; G06Q 10/087
See application file for complete search history.

(56) References Cited

U.S. PATENT DOCUMENTS

| | | | | |
|---|---|---|---|---|
| 5,059,951 A * | 10/1991 | Kaltner | G06K 7/10881 | 235/487 |
| 6,025,780 A * | 2/2000 | Bowers | G07G 3/003 | 705/28 |
| 2003/0174099 A1* | 9/2003 | Bauer | G06K 7/10336 | 343/893 |
| 2013/0278425 A1* | 10/2013 | Cunningham | G08B 13/246 | 340/572.1 |
| 2019/0073497 A1* | 3/2019 | Burchell | G04F 10/00 | |

* cited by examiner

*Primary Examiner* — Mirza F Alam
(74) *Attorney, Agent, or Firm* — Lee & Hayes, P.C.

(57) ABSTRACT

This disclosure describes, in part, devices and methods for deactivating tags. For instance, an electronic device may include antennas that transmit signals and/or fields for deactivating the tags. In some examples, the electronic device includes a first gate that includes a first portion of the antennas and a second gate that includes a second portion of the antennas. To deactivate the tags, the electronic device may detect locations of an object relative to the electronic device. The electronic device may then activate a respective tag and/or a respective group of tags based on the location of the object. For example, the electronic device may activate a first tag and/or a first group of tags when the object is at a first location, activate a second tag and/or a second group of tags when the object is at a second location, and/or so forth.

21 Claims, 11 Drawing Sheets

DEVICES AND TECHNIQUES FOR DEACTIVATING TAGS

BACKGROUND

Retail stores may place security tags on items, where the security tags cause alarms to activate when the items are wrongfully taken from the retail stores. In order to avoid activating the alarms, cashiers may remove and/or deactivate the security tags at times that customers purchase the items. For example, a cashier may place an item that includes a security tag above an electronic device that transmits a signal, where the signal is configured to cause the security tag to deactivate. This way, even if the security tag is still attached to the item as the item is removed from the retail store, the security tag does not cause the alarm to activate. As such, it is important that these electronic devices cause all of the security tags to deactivate when the customers purchase the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
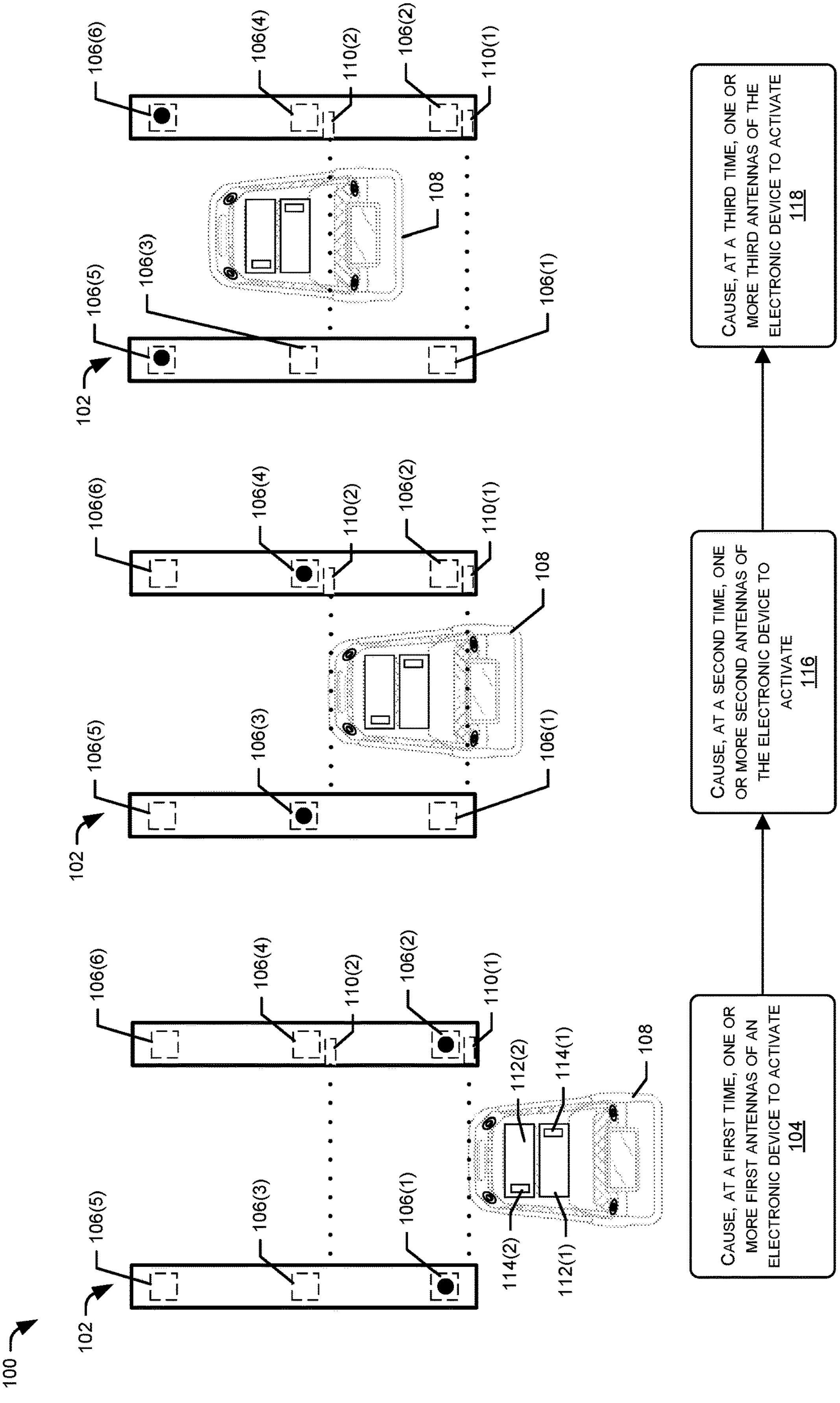
FIG. 1 illustrates an example process for deactivating tags using an electronic device, in accordance with examples of the present disclosure.

This disclosure describes, in part, an electronic device, such as a checkpoint, for deactivating tags. For instance, the electronic device may include antennas that are configured to transmit signals and/or fields for deactivating the tags. In some examples, the antennas are located at different locations and/or oriented at different directions. In some examples, such as when the electronic device is the checkpoint, the electronic device may include at least two gates, where each gate includes one or more antennas. To deactivate the tags using the antennas, the electronic device detects locations of an object with respect to the electronic device. In some examples, the electronic device detects the locations using one or more sensors, such as one or more motion sensors. The electronic device then activates different antennas and/or different groups of antennas based on the locations of the object. This way, and based on legal requirements (described below), the electronic device may be able to activate the different antennas and/or the different groups of antennas using more power as compared to activating all of the antennas at a single instance.

For more details, the electronic device may include a checkpoint, a pad, a wand, a phone, a gate, a door, and/or any other type of device that includes antennas. The antennas located within the electronic device may be located at various vertical locations and/or various horizontal locations within the electronic device. For example, a first antenna may be located a first distance from a top edge of the electronic device, a second antenna may be located a second distance from the top edge of the electronic device, and a third antenna may be located a third distance from the top edge of the electronic device. For another example, the first antenna may be located a fourth distance from a front edge of the electronic device, the second antenna may be located a fifth distance from the front edge of the electronic device, and the third antenna may be located a sixth distance from the front edge of the electronic device. In these examples, one or more of the distances may be similar to one another and/or one or more of the distances may be different from one another.

The antennas may also be orientated at various directions with respect to the electronic device. For example, the first antenna may be oriented in a first direction with respect to the electronic device, the second antenna may be oriented in a second direction with respect to the electronic device, and the third antenna may be oriented in a third direction with respect to the electronic device. In this example, one or more of the directions may be similar to one another and/or one or more of the directions may be different from one another. Additionally, while these examples describe the electronic device as including three antennas, in other examples, the electronic device may include any number of antennas located at different locations and/or oriented in different directions.

In some examples, such as when the electronic device is a checkpoint, the electronic device may include at least a first gate that includes first antennas and a second gate that includes second antennas. The first gate and the second gate may be separated from one another and configured such that users pass between the first gate and the second gate. Additionally, the first antennas located within the first gate and the second antennas located within the second gate may be located at various vertical locations, located at various horizontal locations, and/or are oriented in different directions. Furthermore, in some examples, the first antennas located within the first gate may include similar horizontal locations, vertical locations, and/or orientations as the second antennas located within the second gate.

For example, a first antenna located within the first gate may include a same vertical location, horizontal location, and orientation as a second antenna located within the second gate, a third antenna located within the first gate may include a same vertical location, horizontal location, and orientation as a fourth antenna located within the second gate, and a fifth antenna located within the first gate may include a same vertical location, horizontal location, and orientation as a sixth antenna located within the second gate. Again, while this example describes each of the gates as including three different antennas, in other examples, the first gate and/or the second gate may include any number of antennas. Additionally, in other examples, the first gate or the second gate may not include any antennas.

In some examples, the electronic device may include one or more motors that are configured to change the orientation of one or more antennas such that the one or more antennas are able to transmit the signals and/or fields in various directions. For example, a motor associated with an antenna may be configured to change the orientation of the antenna, at least while the antenna is activated, in order to change the horizontal direction for which the antenna is outputting the signal and/or field. For another example, a motor associated with an antenna may be configured to change the orientation of the antenna, at least while the antenna is activated, in order to change the vertical direction for which the antenna is outputting the signal and/or field. Motor control of directions could be preprogrammed (automatic) or as a function of the tote position location within the gates, or even the tote speed within the gates.

In some examples, the electronic device may include one or more sensors, such as one or more motion sensors, to detect objects. For example, the electronic device may include a first motion sensor that is configured to detect objects at a first location relative to the electronic device, a second motion sensor that is configured to detect the objects at a second location relative to the electronic device, and/or the so forth. In some examples, the sensors may be configured such that the sensors are configured to detect the objects as the objects move past the electronic device. For example, and in the example above, the first motion sensor may be located at a front of the electronic device and configured to detect the objects that are located proximate to the front of the electronic device and the second motion sensor may be located at the center of the electronic device and configured to detect the objects that are later located proximate to the center of the electronic device.

To deactivate the tags, the electronic device may be configured to activate different antennas at different times. This may be to increase the transmission output power for each antenna when activated and adhere to FCC max power limits. For example, based on regulations (e.g., Federal Communications Commission (FCC) regulations), the combined power output of activated antennas is required to be equal to or below a set limit. As such, if the electronic device were to activate all of the antennas at a single instance, then the average transmission power output of the antennas would need to be less than if the electronic device were only to activate a portion of the antennas at a single instance. Because of this, the electronic device may be configured to activate a first antenna and/or a first group of antennas at a first time, deactivate the first antenna and/or the first group of antennas at a second time, then activate a second antenna and/or a second group of antennas at a third time, deactivate the second antenna and/or the second group of antennas at a fourth time, and/or so forth until all of the antennas and/or groups of antennas are activated and deactivated.

In some examples, the electronic device activates and deactivates the antennas based on the locations of objects relative to the electronic device or based on preprogrammed profile that rotates antenna even if the cart has stopped moving. For example, the electronic device may activate first antenna(s) when an object is located at a first location relative to the electronic device, deactivate the first antenna(s) and then activate second antenna(s) when the object is located at a second location relative to the electronic device, deactivate the second antenna(s) and activate third antenna(s) when the object is located at a third location relative to the electronic device, and/or so forth. This way, the electronic device is able to activate the antenna(s) that are closest to the object as the object is passing by and/or through the electronic device. For example, the first antenna(s) may be located near a front of the electronic device and the first location may be located proximate to the front of the electronic device. Additionally, the second antenna(s) may be located near a center of the electronic device and the second location may be located proximate to the center of the electronic device. Furthermore, the third antenna(s) may be located near a back of the electronic device and the third location may be located proximate to the back of the electronic device.

In some examples, the electronic device may activate and deactivate antennas included in a group of antennas at different time periods, such as to maximize the average power output of the antennas. For example, a group of antennas may include a first antenna located in a first gate and a second antenna located in a second gate. As such, when the electronic device determines to activate antennas included in the group of antennas, the first electronic device may activate the first antenna for a first period of time, deactivate the first antenna at the elapse of the first period of time, activate the second antenna during a second period of time, and deactivate the second antenna at the elapse of the second period of time. In some examples, the electronic device may repeat this "back-and-forth" process while the electronic device determines to activate the antennas included in the group of antennas.

In some examples, a transmitter of the electronic device may include a phased array of antennas for transmitting in different directions. For example, the transmitter may use the phased array of antennas to output a first plane wave in a first direction during a first period of time, output a second plane wave in a second direction during a second period of time, and/or so forth. This way, the transmitter is able to transmit in different directions while the antennas are activated. As such, and in such examples, the electronic device may not be required to include motor(s), but may still be able to change the directions for which the antennas are transmitting the signal(s) and/or field.

In some examples, the electronic device may be part of an electronic alert surveillance (EAS) system that is located within a facility. In some examples, the EAS system may include a radio frequency EAS system, an Electromagnetic EAS system, an acousto-magnetic EAS system, and/or any other type of security system. Items included within the facility may include the tags, where the tags are initially in an activate state. While in the activate state, the tags will cause an alarm to activate when the tags pass through a specific area of the facility (e.g., a gate located near an entrance of the facility). For example, while in the activate state, the tags may be configured to transmit signals that cause the alarm to activate. As such, the electronic device may be configured to change the tags from the activate state to an inactive state. While in the inactive state, the tags will no longer cause the alarm to activate when the tags pass through the specific area of the facility.

In some examples, the antennas are configured to change the tags from activate states to inactivate states by causing the tags to no longer have the ability to transmit signals or fusing the tag to prevent activation triggers. For example, and when the EAS system is a radio frequency EAS system, the antennas may be configured to output radio frequency (RF) signal(s) when activated, where the RF signal(s) are configured to cause the tags to no longer transmit signals (e.g., change the tags to inactive states). For instance, the RF signal(s) may be configured to destroy diodes and/or transmitting components included within the tags. For another example, and when the EAS system is a magnetic EAS system, the antennas may be configured to transmit fields (e.g., magnetic fields) when activated, where the fields are configured to deactivate the tags by again causing the tags to no longer transmit signals (e.g., change the tags to inactivate states). While these are just a couple example techniques of how different EAS systems operate to deactivate tags, in other examples, the electronic device may deactivate the tags using one or more additional and/or alternative techniques.

As described herein, a tag may include a soft tag, a hard tag, and/or any other type of tag that may be attached to an item. For example, the tag may include, but is not limited to, a shell tag, a clutch tag, a pin tag, a sticker tag, a hook tag, an insert tag, and/or any other type of tag that may be attached to and/or placed within an item.

Additionally, in some examples, activating a transmitter and/or antenna may include causing the transmitter and/or antenna to transmit signal(s) and/or a field (e.g., turning on the transmitter and/or antenna). For example, activating the transmitter and/or the antenna may include providing power to the transmitter and/or antenna such that the transmitter and/or antenna transmits the signal(s) and/or the field. Furthermore, in some examples, deactivating a transmitter and/or antenna may include causing the transmitter and/or antenna to no longer transmit signal(s) and/or a field (e.g., turning off the transmitter and/or antenna). For example, deactivating the transmitter and/or antenna may include ceasing from providing power to the transmitter and/or antenna such that the transmitter and/or antenna does not transmit the signal(s) and/or the field.

When an antenna (and/or transmitter) is activated, the output power (e.g., transmitter output power) may include the actual amount of power (e.g., in watts) of energy (e.g., RF or electromagnetic energy) that is produced by the antenna (and/or the transmitter). In some examples, the electronic device is able to change the output power of each antenna (and/or antenna). Additionally, the when more than one antenna (and/or transmitter) is activated, the combined output power may include the actual power that is produced by all of the activated antennas (and/or the transmitters).

FIG. 1 illustrates an example process 100 for deactivating tags using an electronic device 102, in accordance with examples of the present disclosure. At 104, the process 100 may include causing, at a first time, one or more first antennas of an electronic device to activate. For instance, the electronic device 102 may activate at least a first antenna 106(1) and a second antenna 106(2) at the first time, where the activation is represented by the solid circles associated with the antennas 106(1)-(2). In some examples, the electronic device 102 activates the antennas 106(1)-(2) based on detecting an object, such as a tote 108 (e.g., a shopping cart), located at a first location relative to the electronic device 102. In the example of FIG. 1, the electronic device 102 may detect the tote 108 at the first location based on a first motion sensor 110(1) detecting the tote 108.

In the example of FIG. 1, the tote 108 may be carrying at least a first item 112(1) that includes a first tag 114(1) and a second item 112(2) that includes a second tag 114(2). As such, the antennas 106(1)-(6) (also referred to as "antennas 106") of the electronic device 102 may be configured to switch the tags 114(1)-(2) (also referred to as "tags 114") from activate states, in which the tags 114 are configured to trigger an alarm (e.g., by transmitting signals), to inactive states, in which the tags 114 are no longer configured to trigger the alarm (e.g., by no longer being able to transmit the signals). For example, the antennas 106 may be configured to transmit, when activated, signal(s) and/or field(s) that cause the tags 114 to switch to the inactivate states.

At 116, the process 100 may include causing, at a second time, one or more second antennas of the electronic device to activate. For instance, the electronic device 102 may activate at least the third antenna 106(3) and the fourth antenna 106(4) at the second time, where the activation is represented by the solid circles associated with the antennas 106(3)-(4). Additionally, before activating the antennas 106(3)-(4), the electronic device 102 may deactivate the antennas 106(1)-(2). In some examples, the electronic device 102 deactivates the antennas 106(1)-(2) and/or activates the antennas 106(3)-(4) based on detecting the tote 108 located at a second location relative to the electronic device 102. In the example of FIG. 1, the electronic device 102 may detect the tote 108 at the second location based on a second motion sensor 110(2) detecting the tote 108.

At 118, the process 100 may include causing, at a third time, one or more third antennas of the electronic device to activate. For instance, the electronic device 102 may activate at least the fifth antenna 106(5) and the sixth antenna 106(6) at the third time, where the activation is represented by the solid circles associated with the antennas 106(5)-(6). Additionally, before activating the antennas 106(5)-(6), the electronic device 102 may deactivate the antennas 106(3)-(4). In some examples, the electronic device 102 deactivates the antennas 106(3)-(4) and/or activates the antennas 106(5)-(6) based on detecting the tote 108 located at a third location relative to the electronic device 102. In the example of FIG. 1, the electronic device 102 may detect the tote 108 at the third location based on the first motion sensor 110(1) no longer detecting the tote 108 while the second motion sensor 110(2) is still detecting the tote 108.

In some examples, the electronic device 102 may then determine that a period of time has elapsed since detecting the tote 108 at the third location and/or activating the antennas 106(5)-(6). As described herein, a period of time may include, but is not limited to, one millisecond, one hundred milliseconds, one second, two seconds, five seconds, and/or any other period of time. Based on the period of time elapsing, the electronic device 102 may then cause the antennas 106(5)-(6) to deactivate. Additionally, or alternatively, in some examples, the electronic device 102 may detect a new object, such as by using the first motion sensor 110(1). Based on detecting the new object, the electronic device 102 may cause the antennas 106(5)-(6) to deactivate.

It should be noted that while the example of FIG. 1 describes the electronic device 102 activating groups of antennas at a single instance, in other examples, the electronic device 102 may separately activate each antenna included in a group of antennas at a single instance. For example, at the first time, the electronic device 102 may initially activate the first antenna 106(1). The electronic device 102 may then deactivate the first antenna 106(1), activate the second antenna 106(2), deactivate the second antenna 106(2), activate the first antenna 106(1), deactivate the first antenna 106(1), activate the second antenna 106(2), and/or so forth until the second time, when the electronic device 102 deactivates the group of antennas that includes the first antenna 106(1) and the second antenna 106(2). The electronic device 102 may perform similar processes for the group of antennas that includes the third antenna 106(3) and the fourth antenna 106(4) as well as the group of antennas that includes the fifth antenna 106(5) and the sixth antenna 106(6). In other examples, the tote 108 location activates first antenna 106(1) for a time period then deactivates the first antenna 106(1) and it is timed to immediately activate the second antenna 106(2) for same time period. Next, as the tote 108 moves in it repeats activating the third antenna 106(3) the middle of electronic device 102, then deactivates the third antenna 106(3) followed by pre-timed automatic activation of the fourth antenna 106(4). In other examples, all six antennas 106 are triggered sequentially 1 to 6 as soon as the tote 108 is detected at entry of electronic device 102, then repeats over and over until the tote 108 exists electronic device 102.

In some examples, the electronic device 102 may generate a first signal (e.g., first data) indicating that the tote 108 is entering the electronic device 102 (e.g., indicating that the tote 108 is at the first location), a second signal (e.g., second data) indicating that the tote 108 is exiting the electronic device, and/or a third signal (e.g., third data) indicating that the tote 108 is moving in the reverse direction through the electronic device 102. The electronic device 102 may then perform one or more processes based on the signal(s). For a first example, the electronic device 102 may activate one or more of the antennas 106 (e.g., the first antenna 106(1) and/or the second antenna 106(2)) when the first signal is generated. For a second example, the electronic device 102 may activate all of the antennas 106 in the patterns described herein when the first signal is generated. For a third example, the electronic device 102 may deactivate one or more antennas (e.g., the fifth antenna 106(5) and the sixth antenna 106(6)) based on the second signal being generated.

Still, for a fourth example, the electronic device 102 may deactivate one or more of the antennas 106 (e.g., all of the antennas 106) based on the third signal being generated. For example, if the tote 102 has already passed through the electronic device 102 and then begins to reverse back through the electronic device 102, then the electronic device 102 may determine to deactivate all of the antennas 106 since the antennas 106 were already used to deactivate the tags 114. In some examples, the electronic device 102 determines that the tote 108 is moving in reverse based on the locations of the tote 108 relative to the electronic device 102. For a first example, the electronic device 102 may determine that the tote 108 is moving in reverse based on the second motion 110(2) detecting the tote 108 before the first motion sensor 10(1) detects the tote 108. For a second example, the electronic device 102 may determine that the tote 108 is moving in reverse based on the first motion sensor 110(1) again detecting the tote 108 after the first motion sensor 110(1) had originally stopped detecting the tote 108.

By performing the processes described in FIG. 1, the electronic device 102 is able to increase the average power output by the antennas 106. For example, and based on regulation(s), activate antennas 106 may only be able to transmit a combined maximum power output at a single instance. As such, the more antennas 106 that are active at a single instance, the less the average power output each antenna 106 is able to transmit. As such, by only activating groups of antennas at single instances, the average power output by each antenna 106 is increased. Additionally, by activating the groups of antennas that are close to the tags 114, the more likely it is that the tags 114 will switch from the activate states to the inactive states while the tote 108 is pushed by the electronic device 102.

Figure 2A:
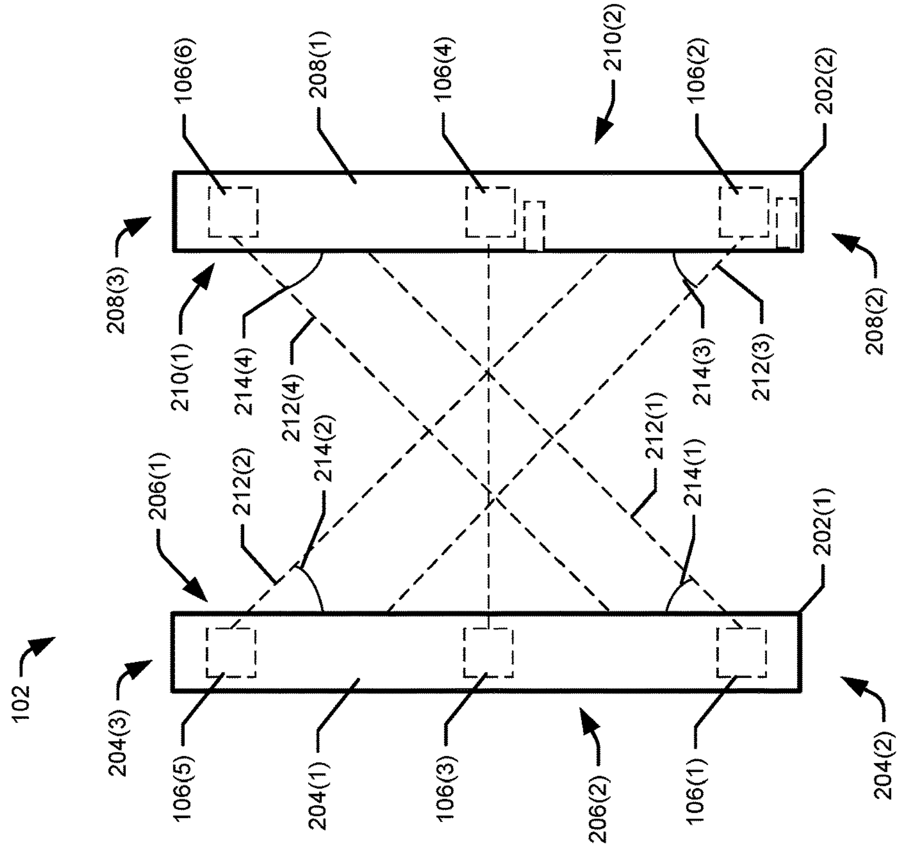
FIGS. 2A-2D illustrate a first example of an electronic device for deactivating tags, in accordance with examples of the present disclosure.
Figure 2B:
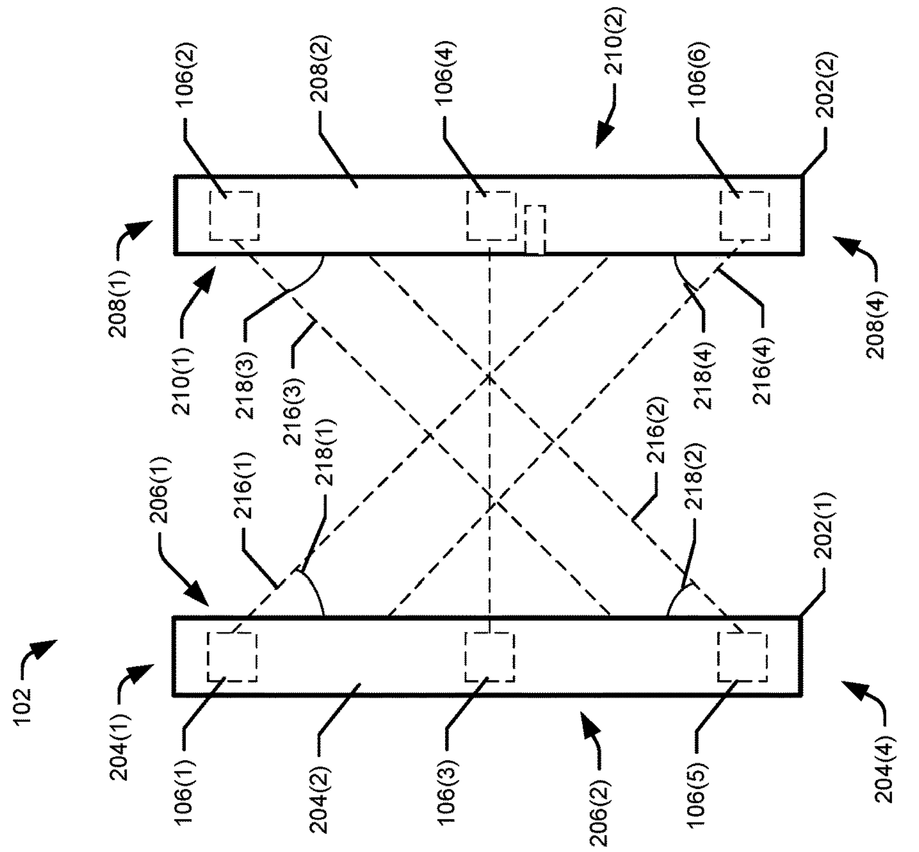

FIGS. 2A-2D illustrate a first example of the electronic device 102 that deactivates tags, in accordance with examples of the present disclosure. For instance, FIG. 2A illustrates a top view of the electronic device 102. As shown, the electronic device 102 may include at least a first gate 202(1) and a second gate 202(2). The first gate 202(1) includes a first side 204(1) (e.g., a top side), a second side 204(2) (e.g., a frontside), a third side 204(3) (e.g., a backside), a fourth side 204(4) (e.g., a bottom side, which is illustrated in FIG. 2B), a first surface 206(1) (e.g., an inside surface), and a second surface 206(2) (e.g., an outside surface). Additionally, the second gate 202(2) includes a first side 208(1) (e.g., a top side), a second side 208(2) (e.g., a frontside), a third side 208(3) (e.g., a backside), a fourth side 208(4) (e.g., a bottom side, which is illustrated in FIG. 2B), a first surface 210(1) (e.g., an inside surface), and a second surface 210(2) (e.g., an outer surface).

The first gate 202(1) also includes the first antenna 106(1), the third antenna 106(3), and the fifth antenna 106(5), while the second gate 202(2) includes the second antenna 106(2), the fourth antenna 106(4), and the sixth antenna 106(6). As shown, the first antenna 106(1) may be oriented such that the first antenna 106(1) transmits in a first horizontal direction 212(1). The first horizontal direction 212(1) may be at a first angle 214(1) with respect to the first surface 206(1) of the first gate 202(1). Additionally, the third antenna 106(3) may be oriented such that the third antenna 106(3) transmits in a second horizontal direction (which is illustrated by the dashed line from the third antenna 106(3)). The second horizontal direction may be perpendicular with respect to the first surface 206(1) of the first gate 202(1). Furthermore, the fifth antenna 106(5) may be oriented such that the fifth antenna 106(5) transmits in a third horizontal direction 212(2). The third horizontal direction 212(2) may be at a second angle 214(2) with respect to the first surface 206(1) of the first gate 202(1).

The second antenna 106(2) may be oriented such that the second antenna 106(2) transmits in a fourth horizontal direction 212(3). The fourth horizontal direction 212(3) may be at a third angle 214(3) with respect to the first surface 210(1) of the second gate 202(2). Additionally, the fourth antenna 106(4) may be oriented such that the fourth antenna 106(4) transmits in a fifth horizontal direction (which is illustrated by the dashed line from the fourth antenna 106(4)). The fifth horizontal direction may be perpendicular with respect to the first surface 210(1) of the second gate 202(2). Furthermore, the sixth antenna 106(6) may be oriented such that the sixth antenna 106(6) transmits in a sixth horizontal direction 212(4). The sixth horizontal direction 212(4) may be at a fourth angle 214(4) with respect to the first surface 210(1) of the second gate 202(2).

In some examples, the first angle 214(1), the second angle 214(2), the third angle 214(3), and the fourth angle 214(4) may be equal to one another. In other examples, one or more of the first angle 214(1), the second angle 214(2), the third angle 214(3), or the fourth angle 214(4) may be different from one another. Additionally, in some examples, the first angle 214(1) and/or the second angle 214(2) may be perpendicular with respect to the first surface 206(1) of the first gate 202(1) and/or the third angle 214(3) and/or the fourth angle 214(4) may be perpendicular with respect to the first surface 210(1) of the second gate 202(2). As described herein, an angle may include, but is not limited to, twenty-five degrees, third-five degrees, forty-five degrees, fifty-five degrees, sixty-five degrees, and/or any other angle.

FIG. 2B, illustrates the vertical output directions associated with the antennas 106. As shown, the first antenna 106(1) may be oriented such that the first antenna 106(1) transmits in a first vertical direction 216(1). The first vertical direction 216(1) may be at a first angle 218(1) with respect to the first surface 206(1) of the first gate 202(1). Additionally, the third antenna 106(3) may be oriented such that the third antenna 106(3) transmits in a second vertical direction (which is illustrated by the dashed line from the third antenna 106(3)). The second vertical direction may be perpendicular with respect to the first surface 206(1) of the first gate 202(1). Furthermore, the fifth antenna 106(5) may be oriented such that the fifth antenna 106(5) transmits in a third vertical direction 216(2). The third vertical direction 216(2) may be at a second angle 218(2) with respect to the first surface 206(1) of the first gate 202(1).

The second antenna 106(2) may be oriented such that the second antenna 106(2) transmits in a fourth vertical direction 216(3). The fourth vertical direction 216(3) may be at a third angle 218(3) with respect to the first surface 210(1) of the second gate 202(2). Additionally, the fourth antenna 106(4) may be oriented such that the fourth antenna 106(4) transmits in a fifth vertical direction (which is illustrated by the dashed line from the fourth antenna 106(4)). The fifth vertical direction may be perpendicular with respect to the first surface 210(1) of the second gate 202(2). Furthermore, the sixth antenna 106(6) may be oriented such that the sixth antenna 106(6) transmits in a sixth vertical direction 216(4). The sixth vertical direction 216(4) may be at a fourth angle 218(4) with respect to the first surface 210(1) of the second gate 202(2).

In some examples, the first angle 218(1), the second angle 218(2), the third angle 218(3), and the fourth angle 218(4) may be equal to one another. In other examples, one or more of the first angle 218(1), the second angle 218(2), the third angle 218(3), or the fourth angle 218(4) may be different from one another. Additionally, in some examples, the first angle 218(1) and/or the second angle 218(2) may be perpendicular with respect to the first surface 206(1) of the first gate 202(1) and/or the third angle 218(3) and/or the fourth angle 218(4) may be perpendicular with respect to the first surface 210(1) of the second gate 202(2).

Although the examples of FIGS. 2A-2B illustrate the first antenna 106(1), the second antenna 106(2), the fifth antenna 106(5), and the sixth antenna 106(6) as including both horizontal output angles and vertical output angles, in other examples, one or more of the first antenna 106(1), the second antenna 106(2), the fifth antenna 106(5), or the sixth antenna 106(6) may only include a horizontal output angle that is not perpendicular or a vertical output angle that is not perpendicular. For example, the first antenna 106(1) may include the first angle 214(1) illustrated in the example of FIG. 2A, but may also include a vertical output that is perpendicular with respect to the first surface 206(1) of the first gate 202(1).

Figure 2D:
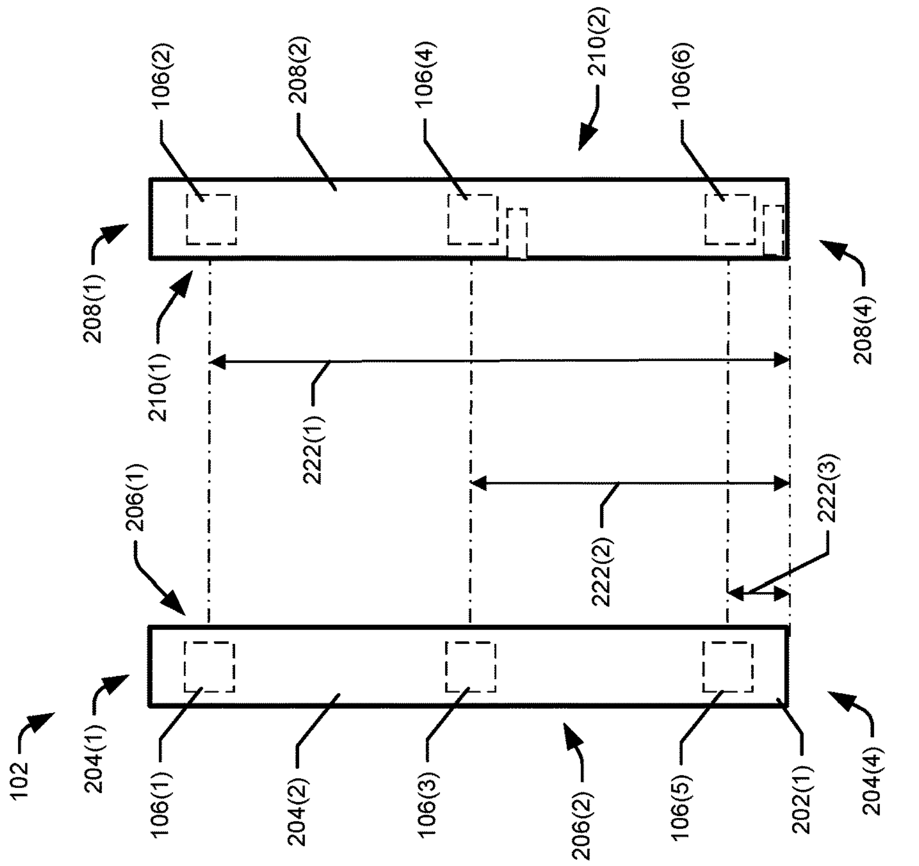
Figure 2C:
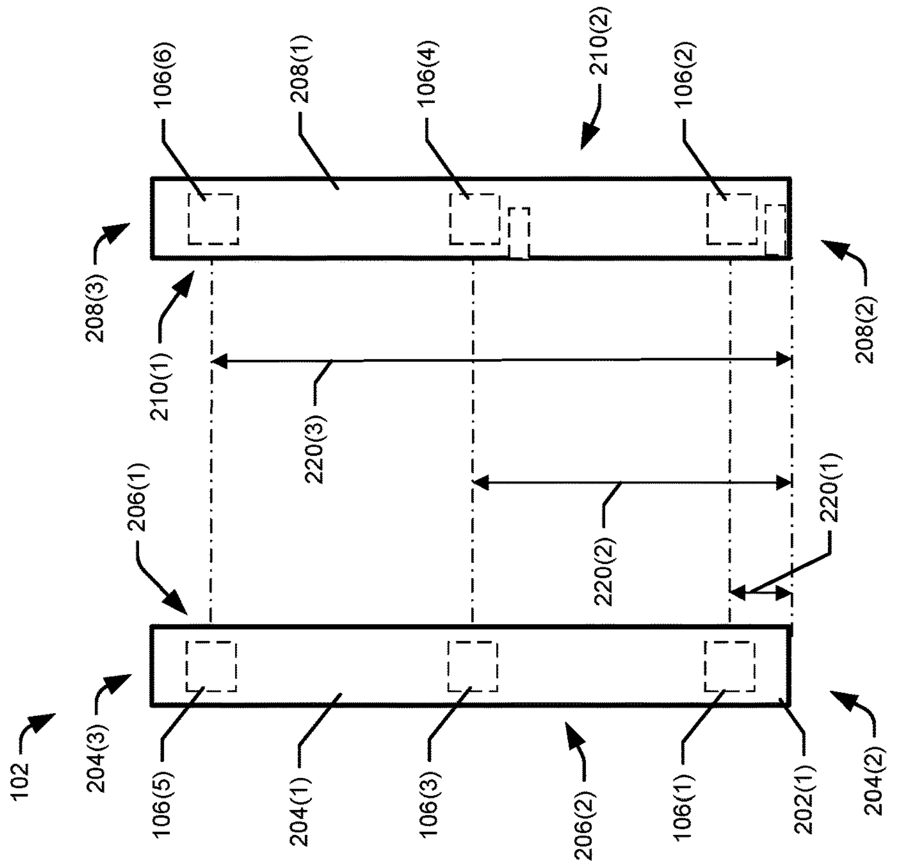

FIG. 2C illustrates the horizontal locations of the antennas 106 within the electronic device 102. For example, and as shown, the first antenna 106(1) may be located a first distance 220(1) from the second side 204(2) of the first gate 202(1) and the second antenna 106(2) may also be located the first distance 220(1) from the second side 208(2) of the second gate 202(2). Additionally, the third antenna 106(3) may be located a second distance 220(2) from the second side 204(2) of the first gate 202(1) and the fourth antenna 106(4) may also be located the second distance 220(2) from the second side 208(2) of the second gate 202(2). Furthermore, the fifth antenna 106(5) may be located a third distance 220(3) from the second side 204(2) of the first gate 202(1) and the sixth antenna 106(6) may also be located the third distance 220(3) from the second side 208(2) of the second gate 202(2).

In some examples, the antennas 106 are activated when objects are located proximate to the antennas 106. For example, when objects are located at a first location with respect to the electronic device 102, such as approximately at the first distance 220(1), then the electronic device 102 may activate the first antenna 106(1) and the second antenna 106(2). Additionally, when objects are located at a second location with respect to the electronic device 102, such as approximately at the second distance 220(2), then the electronic device 102 may activate the third antenna 106(3) and the fourth antenna 106(4). Furthermore, when the objects are located at a third location with respect to the electronic device 102, such as approximately at the third distance 220(3), then the electronic device 102 may activate the fifth antenna 106(5) and the sixth antenna 106(6). This way, the electronic device 102 may activate the antennas 106 that are closest to the objects.

FIG. 2D illustrates the vertical locations of the antennas 106 within the electronic device 102. For example, and as shown, the first antenna 106(1) may be located a first distance 222(1) from the fourth side 204(4) of the first gate 202(1) and the second antenna 106(2) may also be located the first distance 222(1) from the fourth side 208(4) of the second gate 202(2). Additionally, the third antenna 106(3) may be located a second distance 222(2) from the fourth side 204(4) of the first gate 202(1) and the fourth antenna 106(4) may also be located the second distance 222(2) from the fourth side 208(4) of the second gate 202(2). Furthermore, the fifth antenna 106(5) may be located a third distance 222(3) from the fourth side 204(4) of the first gate 202(1) and the sixth antenna 106(6) may also be located the third distance 222(3) from the fourth side 208(4) of the second gate 202(2).

In some examples, the antennas 106 are located at different vertical locations in order to increase the overall transmission area for the antennas 106. For example, the fifth antenna 106(5) and the sixth antenna 106(6) may be closer to item(s) that are located at a bottom of a tote and, as such, may better deactivate the tag(s) associated with those item(s). Additionally, the third antenna 106(3) and the fourth antenna 106(4) may be located closer to item(s) that are located at the center of the tote and, as such, may better deactivate the tags associated with those item(s). Furthermore, the first antenna 106(1) and the second antenna 106(2) may be closer to item(s) that are located at the top of the tote and, as such, may better deactivate the tag(s) associated with those item(s). This way, the antennas 106 are able to deactivate tags of items that are located at various locations within the tote.

Figure 3B:
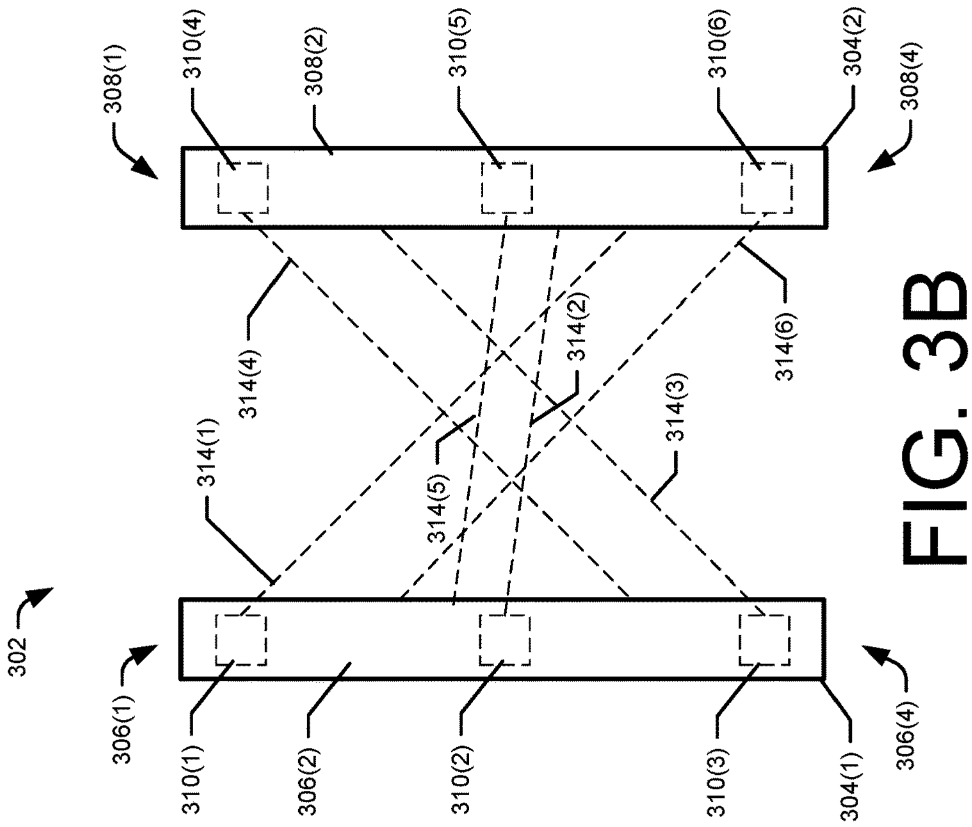
FIGS. 3A-3B illustrate a second example of an electronic device for deactivating tags, in accordance with examples of the present disclosure.
Figure 3A:
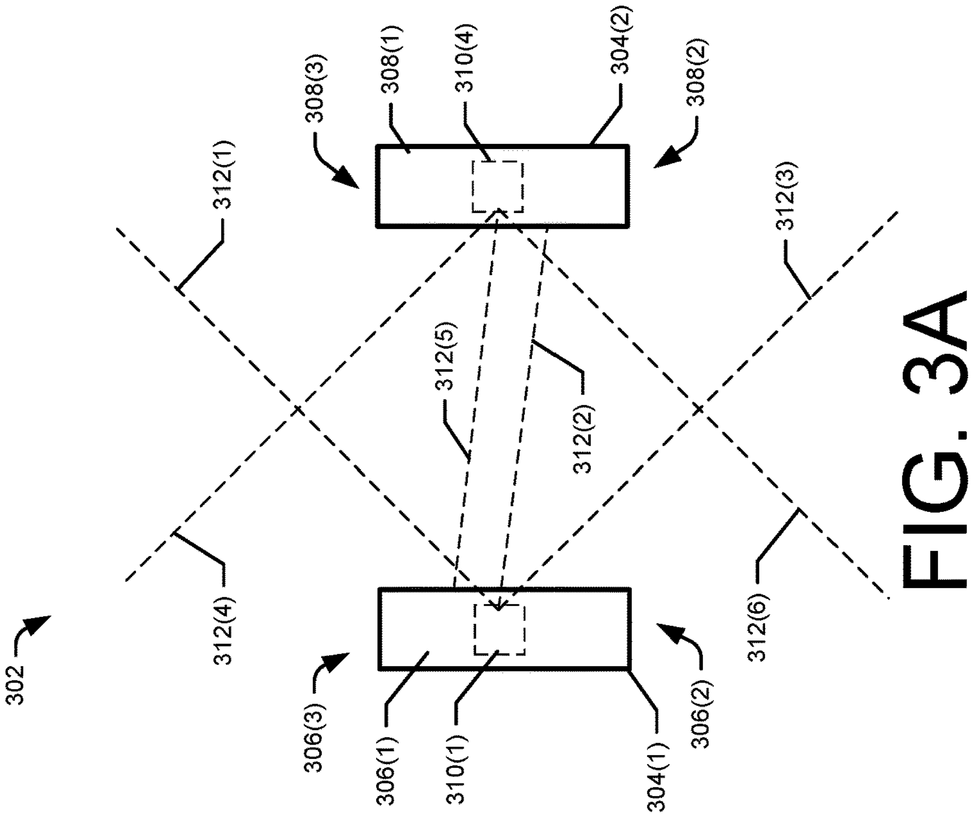

FIGS. 3A-3B illustrate a second example of an electronic device 302 for deactivating tags, in accordance with examples of the present disclosure. As shown, the electronic device 302 may include at least a first gate 304(1) and a second gate 304(2). The first gate 304(1) includes a first side 306(1) (e.g., a top side), a second side 306(2) (e.g., a frontside), a third side 306(3) (e.g., a backside), a fourth side 306(4) (e.g., a bottom side), a first surface (e.g., an inside surface, which is not labeled for clarity reasons), and a second surface (e.g., an outside surface, which is not labeled for clarity reasons). Additionally, the second gate 304(2) includes a first side 308(1) (e.g., a top side), a second side 308(2) (e.g., a frontside), a third side 308(3) (e.g., a backside), a fourth side 308(4) (e.g., a bottom side), a first surface (e.g., an inside surface, which is not labeled for clarity reasons), and a second surface (e.g., an outside surface, which is not labeled for clarity reasons).

The first gate 304(1) also includes a first antenna 310(1), a second antenna 310(2), and a third antenna 310(3), while the second gate 304(2) includes a fourth antenna 310(4), the fifth antenna 310(5), and the sixth antenna 310(6). As shown, the first antenna 310(1) transmits in a first horizontal direction 312(1), the second antenna 310(2) transmits in a second horizontal direction 312(2), the third antenna 310(3) transmits in a third horizontal direction 312(3), the fourth antenna 310(4) transmits in a fourth horizontal direction 312(4), the fifth antenna 310(5) transmits in a fifth horizontal direction 312(5), and the sixth antenna 310(6) transmits in a sixth horizontal direction 312(6). In some examples, one or more of the antennas 310(1)-(6) (also referred to as "antennas 310") may be connected to motor(s) (illustrated in FIG. 4) such that the antenna(s) 310 are able to change the horizontal directions 312(1)-(6) for which the antenna(s) 310 transmit.

For example, the first antenna 310(1) may be connected to a motor such that the first antenna 310(1) is able to change the first horizontal direction 312(1) for which the first antenna 310(1) transmits from the direction illustrated in FIG. 3A for the first antenna 310(1) to a direction that is similar to the third horizontal direction 312(3) of the third antenna 310(3) in the example of FIG. 3A. In some examples, the motor(s) are able to change the horizontal direction(s) 312(1)-(6) for which the antenna(s) 310 transmit between an angle that is forty-five degrees, ninety degrees, one hundred fifty degrees, one hundred eighty degrees, and/or any other angle.

As further shown, the first antenna 310(1) transmits in a first vertical direction 314(1), the second antenna 310(2) transmits in a second vertical direction 314(2), the third antenna 310(3) transmits in a third vertical direction 314(3), the fourth antenna 310(4) transmits in a fourth vertical direction 314(4), the fifth antenna 310(5) transmits in a fifth vertical direction 314(5), and the sixth antenna 310(6) transmits in a sixth vertical direction 314(6). In some examples, the motor(s) connected to the antenna(s) 310 are further able to change the vertical directions 314(1)-(6) for which the antenna(s) 310 transmit.

For example, the first antenna 310(1) may be connected to a motor such that the first antenna 310(1) is able to change the first vertical direction 314(1) for which the first antenna 310(1) transmits from the direction illustrated in FIG. 3B for the first antenna 310(1) to a direction that is similar to the third vertical direction 314(3) of the third antenna 310(3) in the example of FIG. 3B. In some examples, the motor(s) are able to change the vertical direction(s) 314(1)-(6) for which the antenna(s) 310 transmit between an angle that is forty-five degrees, ninety degrees, one hundred fifty degrees, one hundred eighty degrees, and/or any other angle.

In some examples, the electronic device 302 may cause the antenna(s) 310 to rotate (e.g., using the motors) based on the locations of an object relative to the electronic device 302. For example, the electronic device 302 may cause the antenna(s) 310 to transmit in a first direction (e.g., towards the front of the electronic device 302) when the object is detected at a first location (e.g., proximate to the front of the electronic device 302), cause the antenna(s) 310 to transmit in a second direction (e.g., towards the middle of the electronic device 302) when the object is detected at a second location (e.g., proximate to the middle of the electronic device 302), and cause the antenna(s) 310 to transmit in a third direction (e.g., towards the back of the electronic device 302) when the object is detected at a third location (e.g., proximate to the back of the electronic device 302).

Additionally, or alternatively, in some examples, the rotating of the antenna(s) 310 by the electronic device 302 may be preprogrammed. For example, the antenna(s) 310 may rotate in a pattern that preprogrammed into the electronic device 302. In such an example, the antenna(s) 310 may continuously rotate and/or may only rotate when the antenna(s) 310 are activated.

In some examples, and similar to the electronic device 102, the electronic device 302 may activate various antennas 310 at different times. For a first example, the electronic device 302 may activate a first group of antennas 310 (e.g., the first antenna 310(1) and the fourth antenna 310(4)) when an object is located at a first location relative to the electronic device 302, activate a second group of antennas 310 (e.g., the second antenna 310(2) and the fifth antenna 310(5)) when the object is located at a second location relative to the electronic device 302, and activate a third group of antennas 310 (e.g., the third antenna 310(3) and the sixth antenna 310(6)) when the object is located at a third location relative to the electronic device 302.

For a second example, the electronic device 302 may activate the first antenna 310(1) followed by the fourth antenna 310(4) when an object is located at the first location relative to the electronic device 302, activate the second antenna 310(2) followed by the fifth antenna 310(5) when the object is located at the second location relative to the electronic device 302, and activate the third antenna 310(3) followed by the sixth antenna 310(6) when the object is located at a third location relative to the electronic device 302. In such examples, the electronic device 302 may include one or more sensors (which are illustrated in FIG. 4), such as one or more motion sensors, that detect the locations of objects relative to the electronic device 302.

Although the example of FIGS. 3A-3B illustrates both the first gate 304(1) and the second gate 304(2) as including antennas 310, in other examples, only one of the first gate 304(1) or the second gate 304(2) may include antennas 310. Additionally, although the example of FIGS. 3A-3B illustrates both the first gate 304(1) and the second gate 304(2) as including three antennas 310, in other examples, the first gate 304(1) and/or the second gate 304(2) may include any number of antennas 310.

Figure 4:
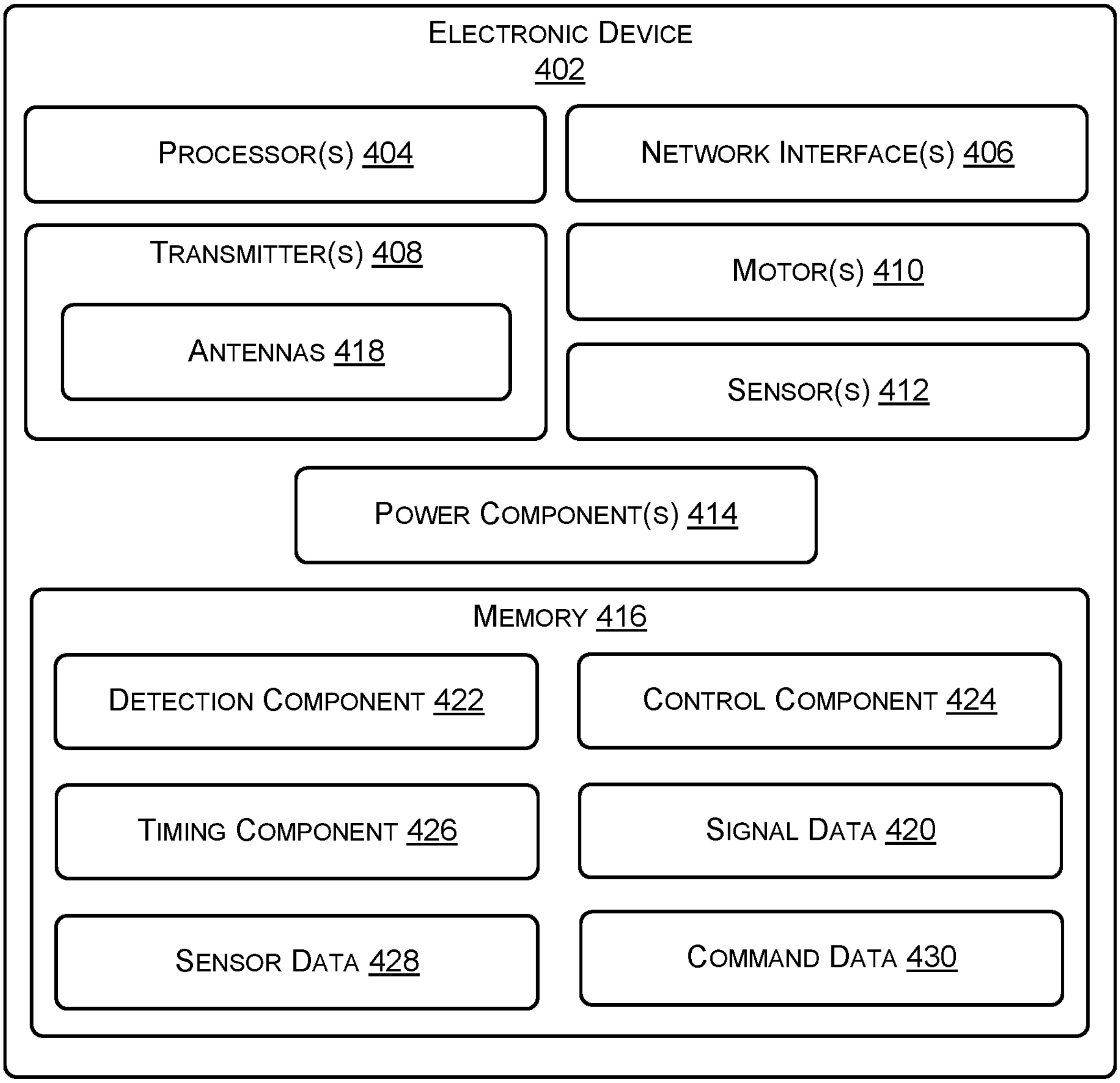
FIG. 4 illustrates a block diagram of an example architecture of an electronic device, in accordance with examples of the present disclosure.

FIG. 4 illustrates a block diagram of an example architecture of an electronic device 402, in accordance with examples of the present disclosure. In some examples, the electronic device 402 may include, and/or represent, the electronic device 102 and/or the electronic device 302. As shown, the electronic device 402 includes one or more processors 404, one or more network interfaces 406, one or more transmitters 408, one or more motors 410, one or more sensors 412, power component(s) 414, and memory 416. Additionally, the transmitter(s) 408 include antennas 418. In some examples, the electronic device 402 may not include one or more of the components illustrated in the example of FIG. 4. Additionally, or alternatively, in some examples, the electronic device 402 may include one or more additional components not illustrated in the example of FIG. 4.

In some examples, the electronic device 402 includes a single transmitter 408 that includes the antennas 418 for deactivating tags. In other examples, the electronic device 402 includes more than one transmitter 408, where each transmitter includes one or more antennas 418. For instance, the electronic device 402 may include six transmitters 408 where each transmitter 408 includes one or more respective antennas 418. In some examples, transmitters(s) 408 and/or antenna(s) 418 are connected to motor(s) 410 that are configured to rotate the transmitter(s) 408 and/or the antenna(s) 418 in order to change the horizontal direction(s) and/or vertical direction(s) for which the antenna(s) 418 transmit.

In some examples, the antennas 418 are configured to transmit signals that represent signal data 420. These signals are configured to deactivate tags by changing the tags from an active state to an inactive state. For example, the antennas 418 may be configured to output RF signals when activated, where the RF signals are configured to cause the tags to no longer transmit signals (e.g., change the tags to inactive states). For instance, the RF signals may be configured to destroy diodes and/or transmitting components included within the tags. Additionally, or alternatively, in some examples, the antennas 418 are configured to transmit fields (e.g., magnetic fields) when activated, where the fields are configured to deactivate the tags by again causing the tags to no longer transmit signals (e.g., change the tags to inactivate states).

The sensor(s) 412 may include, but are not limited to, motion sensor(s), image sensor(s) (e.g., camera(s)), distance sensor(s), proximity sensor(s), heat sensor(s), weight sensor(s), TOF depth sensor, ultrasound sensors, trip line sensors, and/or any other type of sensor that is configured to detect objects. In some examples, the electronic device 402 includes a single sensor 412 that is configured to detect different locations of objects relative to the electronic device 402. In other examples, the electronic device 402 includes multiple sensors 412 that are configured to detect different locations of objects relative to the electronic device 402. For example, and as illustrated in FIG. 1, the electronic device 402 may include multiple motion sensors 412 that the electronic device 402 uses to detect the locations of an object that is passing by the electronic device 402.

The power component(s) 414 may include any type of component that receives power for and/or provides power to the electronic device 402. In some examples, the power component(s) 414 may include one or more components, such as one or more wires, that connect to an external power source. For instance, the power component(s) 414 may receive power from the external power source and provide the power to the processor(s) 404, the network interface(s) 406, the transmitter(s) 408, the motor(s) 410, the sensor(s) 412, the memory 416, and/or the antennas 418. In some examples, the power component(s) 414 may include one or more internal components, such as one or more batteries, that provide power to the electronic device 402. For instance, the power component(s) 414 may include one or more batteries that provide power to the processor(s) 404, the network interface(s) 406, the transmitter(s) 408, the motor(s) 410, the sensor(s) 412, the memory 416, and/or the antennas 418.

As further illustrated in the example of FIG. 4, the electronic device 402 includes a detection component 422, a control component 424, and a timing component 426. The detection component 422 may be configured to determine the locations of objects relative to the electronic device 402. For instance, the sensor(s) 412 of the electronic device 402 may be configured to generate sensor data 428 that the detection component 422 analyzes in order to determine the locations of the objects. For example, if the sensor(s) 412 include motion sensors, then the detection component 422 may be configured to analyze the sensor data 428 in order to determine that a motion sensor detected an object. In some examples, the detection component 422 determines that the motion sensor detected the object based on a value (e.g., a voltage) represented by the sensor data 428 satisfying (e.g., being equal to or greater than) a threshold value.

The detection component 422 may then determine the locations of an object relative to the electronic device 402 based on which motion sensor detected the object. For instance, if the detection component 422 determines that a first motion sensor located proximate to a front of the electronic device 402 detected an object, then the detection component 422 may determine that the object is located at a first location relative to the electronic device 402 (e.g., located proximate to the front of the electronic device 402). Additionally, if the detection component 422 determines that a second motion sensor located proximate to a center of the electronic device 402 detected the object, then the detection component 422 may determine that the object is located at a second location relative to the electronic device 402 (e.g., located proximate to the center of the electronic device 402). Furthermore, if the detection component 422 determines that the first motion sensor is no longer detecting the object, then the detection component 422 may determine that the object is located at a third location relative to the electronic device 402 (e.g., located proximate to the back of the electronic device 402).

For another example, if the sensor(s) 412 include an image sensor, then the detection component 422 may be configured to analyze the sensor data 428 (e.g., image data, video data, etc.) generated by the image sensor in order to determine the locations of an object relative to the electronic device 402. For instance, the detection component 422 may determine that the object is located at a first location relative to the electronic device 402 when a first portion of the sensor data 428 represents the object (e.g., when a first portion of an image represented by the sensor data 428 depicts the object). Additionally, the detection component 422 may determine that the object is located at a second location relative to the electronic device 402 when a second portion of the sensor data 428 represents the object (e.g., when a second portion of an image represented by the sensor data 428 depicts the object). Furthermore, the detection component 422 may determine that the object is located at a third location relative to the electronic device 402 when a third portion of the sensor data 428 represents the object (e.g., when a third portion of an image represented by the sensor data 428 depicts the object).

While these are just a few examples of the detection component 422 determining the locations of objects relative to the electronic device 402 using sensor data 428 generated by different types of sensor(s) 412, in other examples, the detection component 422 may use one or more additional and/or alternative techniques for determining the locations of objects based on the types of sensor(s) 412.

The control component 424 may be configured to activate and deactivate the transmitter(s) 408 and/or the antennas 418. In some examples, the control component 424 activates and deactivates the transmitter(s) 408 and/or the antennas 418 based on the locations of objects relative to the electronic device 402. For a first example, the control component 424 may activate a first antenna 418 when an object is located at a first location relative to the electronic device 402, deactivate the first antenna 418 followed by activating a second antenna 418 when the object is located at a second location relative to the electronic device 402, deactivate the second antenna 418 and activate a third antenna 418 when the object is located at a third location relative to the electronic device 402, and/or so forth. For a second example, the control component 424 may activate a first group of antennas 418 when an object is located at a first location relative to the electronic device 402, deactivate the first group of antennas 418 followed by activating a second group of antennas 418 when the object is located at a second location relative to the electronic device 402, deactivate the second group of antennas 418 and activate a third group of antennas 418 when the object is located at a third location relative to the electronic device 402, and/or so forth.

In some examples, the control component 424 may use the timing component 426 to determine when to activate and deactivate the transmitter(s) 408 and/or the antennas 418. For a first example, and using the first example above, the timing component 426 may determine that a period of time has elapsed since detecting the object at the third location and/or activating the third antenna 418. Based on the period of time elapsing, the control component 424 may deactivate the third antenna 418. For a second example, and using the second example above, the timing component 426 may determine that a period of time has elapsed since detecting the object at the third location and/or activating the third group of antennas 418. Based on the period of time elapsing, the control component 424 may deactivate the third group of antennas 418.

Additionally, or alternatively, in some examples, the control component 424 may use the timing component 426 to determine when to activate and deactivate antennas 418 included in a same group of antennas 418 while the group of antennas 418 is to be activated. For example, and using the second example, if the control component 424 determines to activate a group of antennas 418 that includes a first antenna 418 and a second antenna 418, then the control component 424 may initially activate only the first antenna 418. The timing component 426 may then determine that a first period of time has elapsed since activating the first antenna 418 and, based on the first period of time elapsing, the control component 424 may deactivate the first antenna 418 and activate the second antenna 418. Next, the timing component 426 may determine that a second period of time has elapsed since activating the second antenna 418 and, based on the second period of time elapsing, the control component 424 may deactivate the second antenna 418 and activate the first antenna 418. The control component 424 may then continue to perform these processes until the control component 424 determines to deactivate the group of antennas 418.

As further illustrated in the example of FIG. 4, the electronic device 402 may receive command data 430. As discussed in more detail below, in some examples, remote system(s) may be configured to perform similar processes as the electronic device 402 in order to determine the locations of objects related to the electronic device 402. The remote system(s) may then be configured to determine which transmitter(s) 408 and/or antennas 418 to activate and deactivate based on the locations of the objects, similar to the electronic device 402 described herein. Additionally, the remote system(s) may be configured to send, to the electronic device 402, the command data 430 representing commands to activate and deactivate the transmitter(s) 408 and/or the antenna(s) 418.

For example, based on receiving command data 430 representing a command to activate a first antenna 418, the electronic device 402 may activate the first antenna 418. Next, based on receiving command data 430 representing a command to deactivate the first antenna 418 and/or activate a second antenna 418, the electronic device may deactivate the first antenna 418 and/or activate the second antenna 418. In other words, the processes described herein for determining the locations of the objects relative to the electronic device 402 and/or determining which antennas 418 to activate and deactivate may be performed by the remote system(s), which may then control the electronic device 402 using the command data 430.

As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Network Interface(s) may enable communication of data between the electronic device and one or more other remote systems, as well as other networked devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

FIGS. 5A-7 illustrate various processes for deactivating tags using an electronic device. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 5A:
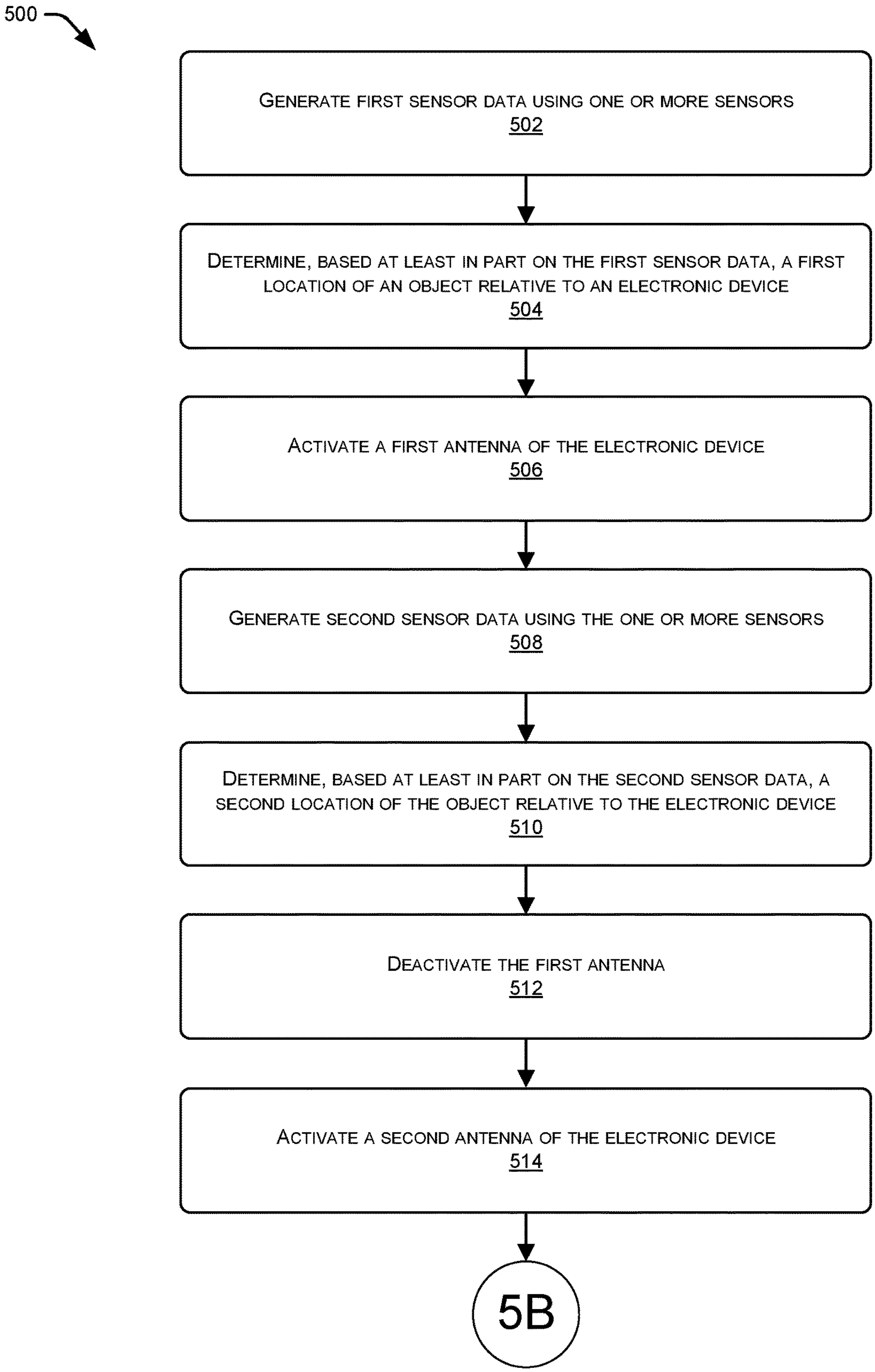
FIGS. 5A-5B illustrate a first process for deactivating tags using an electronic device, in accordance with examples of the present disclosure.
Figure 5B:
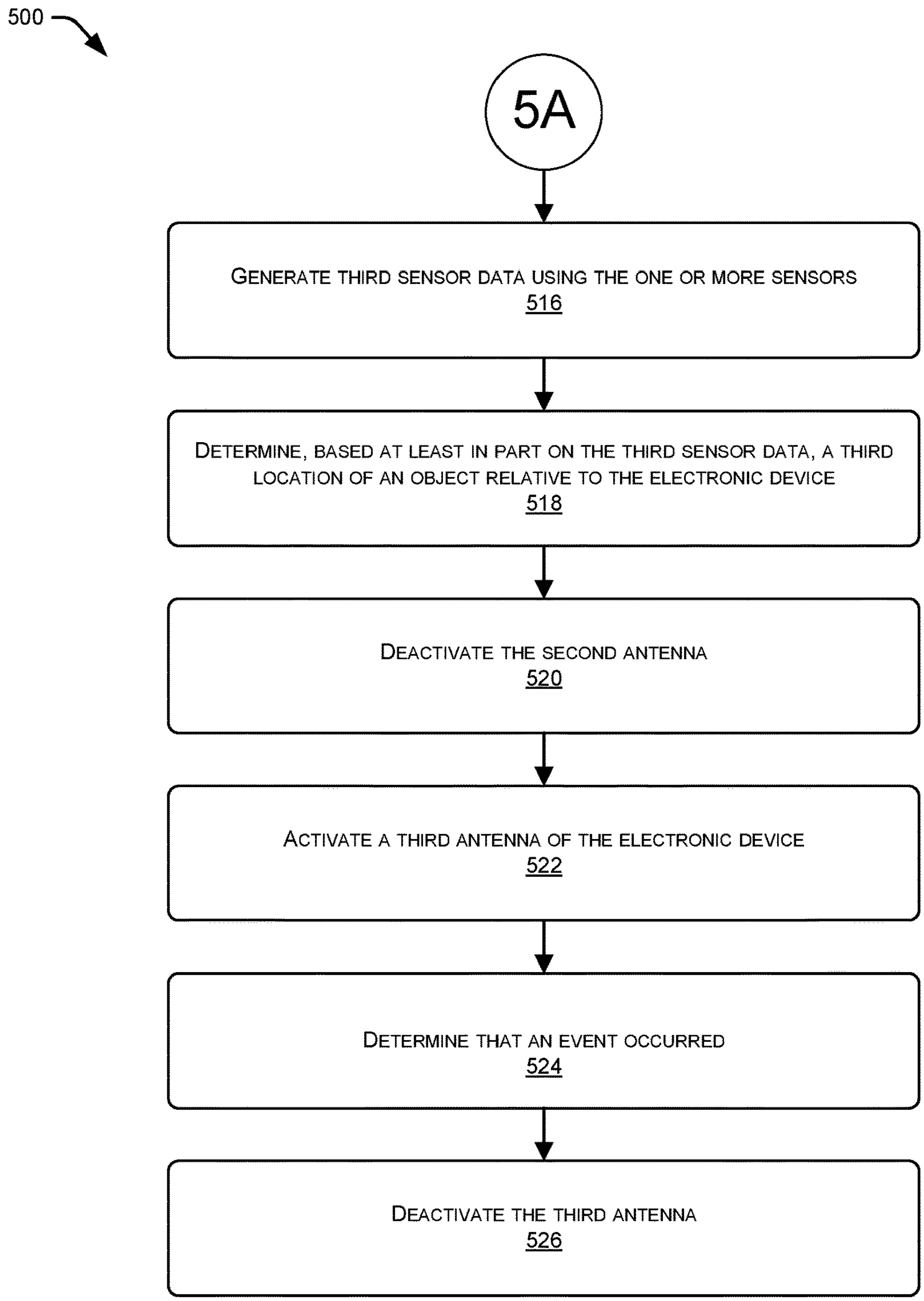

FIGS. 5A-5B illustrate a first example process 500 for deactivating tags using an electronic device, in accordance with examples of the present disclosure. At 502, the process 500 may include generating first sensor data using one or more sensors and at 504, the process 500 may include determining, based at least in part on the first sensor data, a first location of an object relative to an electronic device. For instance, the electronic device 402 may generate the first sensor data using the sensor(s) 412. The electronic device 402 may then analyze the first sensor data in order to determine that the object is located at the first location relative to the electronic device 402. In some examples, the electronic device 402 determines the first location based on determining which sensor(s) 412 detected the object using the first sensor data.

At 506, the process 500 may include activating a first antenna of the electronic device. For instance, based on determining that the object is located at the first location, the electronic device 402 may activate the first antenna. In some examples, the first antenna may be included in a first group of antennas and the electronic device 402 may activate the first group of antennas. Additionally, when the first antenna is included in the first group of antennas, the electronic device 402 may switch between activating and deactivating antennas included in the first group of antennas during a period of time for which the first group of antennas is to be activated.

At 508, the process 500 may include generating second sensor data using the one or more sensors and at 510, the process 500 may include determining, based at least in part on the second sensor data, a second location of the object relative to the electronic device. For instance, the electronic device 402 may generate the second sensor data using the sensor(s) 412. The electronic device 402 may then analyze the second sensor data in order to determine that the object is located at the second location relative to the electronic device 402. In some examples, the electronic device 402 determines the second location based on determining which sensor(s) 412 detected the object using the second sensor data.

At 512, the process 500 may include deactivating the first antenna and at 514, the process 500 may include activating a second antenna of the electronic device. For instance, based on determining that the object is located at the second location, the electronic device 402 may deactivate the first antenna (and/or the first group of antennas) and then activate the second antenna. In some examples, the second antenna may be included in a second group of antennas and the electronic device 402 may activate the second group of antennas. Additionally, when the second antenna is included in the second group of antennas, the electronic device 402 may switch between activating and deactivating antennas included in the second group of antennas during a period of time for which the second group of antennas is to be activated.

At 516, the process 500 may include generating third sensor data using the one or more sensors and at 518, the process 500 may include determining, based at least in part on the third sensor data, a third location of the object relative to the electronic device. For instance, the electronic device 402 may generate the third sensor data using the sensor(s) 412. The electronic device 402 may then analyze the third sensor data in order to determine that the object is located at the third location relative to the electronic device 402. In some examples, the electronic device 402 determines the third location based on determining which sensor(s) 412 detected the object using the third sensor data.

At 520, the process 500 may include deactivating the second antenna and at 522, the process 500 may include activating a third antenna of the electronic device. For instance, based on determining that the object is located at the third location, the electronic device 402 may deactivate the second antenna (and/or the second group of antennas) and then activate the third antenna. In some examples, the third antenna may be included in a third group of antennas and the electronic device 402 may activate the third group of antennas. Additionally, when the third antenna is included in the third group of antennas, the electronic device 402 may switch between activating and deactivating antennas included in the third group of antennas during a period of time for which the third group of antennas is to be activated.

At 524, the process 500 may include determining that an event occurred and at 526, the process 500 may include deactivating the third antenna. For instance, the electronic device 402 may determine that the event occurred. In some examples, the electronic device 402 determines that the event occurred by determining that the object is no longer located proximate to the electronic device 402. In some examples, the electronic device 402 determines that the event occurred by determining that a period of time has elapsed since determining that the object was at the third location and/or activating the third antenna (and/or the third group of antennas). Based on determining that the event occurred, the electronic device 402 may then deactivate the third antenna (and/or the third group of antennas).

Figure 6:
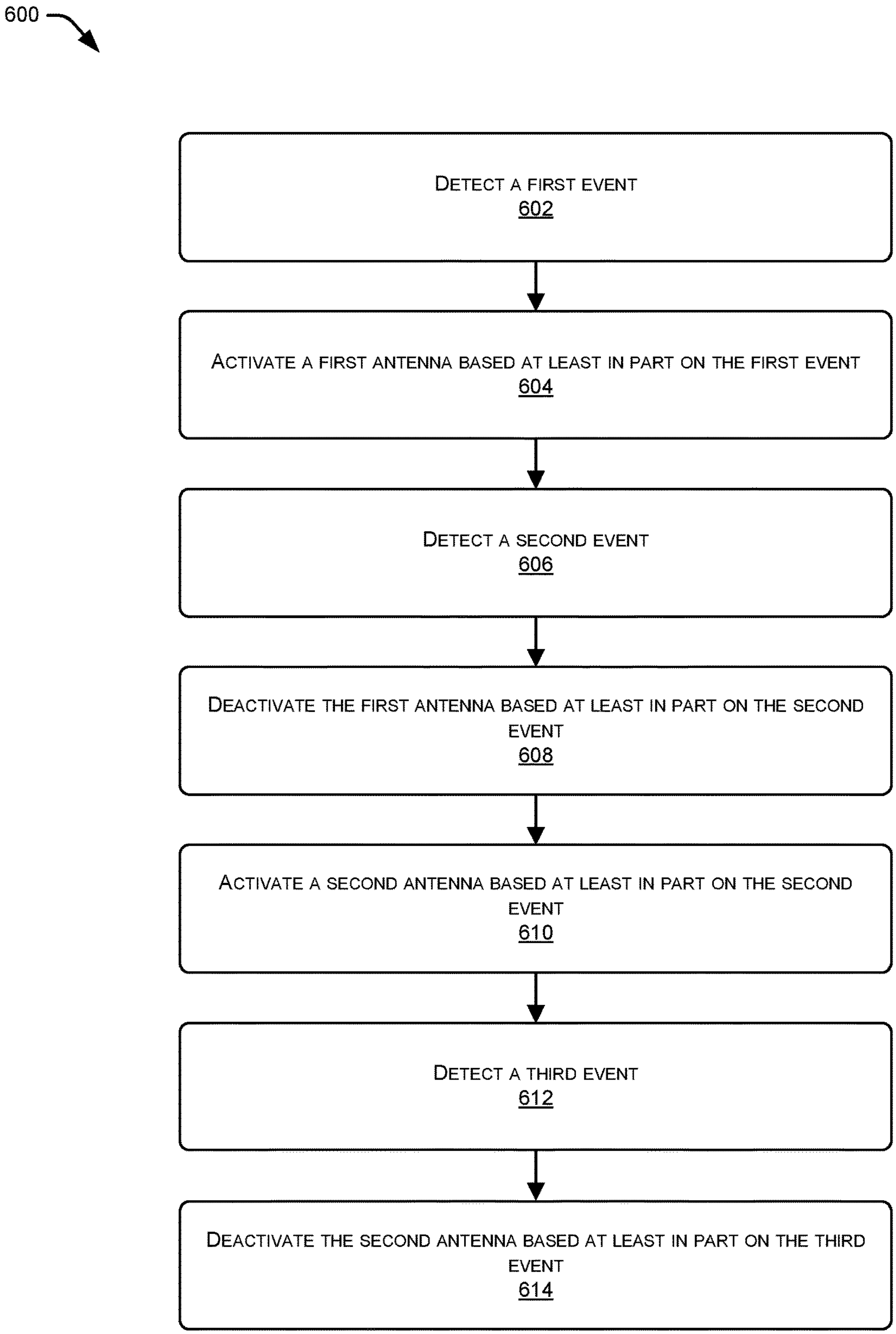
FIG. 6 illustrates a second example process for deactivating tags using an electronic device, in accordance with examples of the present disclosure.

FIG. 6 illustrates a second example process 600 for deactivating tags using an electronic device, in accordance with examples of the present disclosure. At 602, the process 600 may include detecting a first event. For instance, the electronic device 402 may detect the first event. In some examples, the electronic device 402 detects the first event by detecting, using the sensor(s) 412, an object located at a first location relative to the electronic device 402. In some examples, the electronic device 402 detects the first event by determining that a period of time has elapsed since a previous event. Still, in some examples, the electronic device 402 detects the first event by receiving command data from remote system(s).

At 604, the process 600 may include activating a first antenna based at least in part on the first event. For instance, based on detecting the first event, the electronic device 402 may activate the first antenna. In some examples, the first antenna may be included in a first group of antennas and the electronic device 402 may activate the first group of antennas.

At 606, the process 600 may include detecting a second event. For instance, the electronic device 402 may detect the second event. In some examples, the electronic device 402 detects the second event by detecting, using the sensor(s) 412, the object located at a second location relative to the electronic device 402. In some examples, the electronic device 402 detects the second event by determining that a period of time has elapsed since detecting the first event and/or activating the first antenna. Still, in some examples, the electronic device 402 detects the second event by receiving command data from the remote system(s).

At 608, the process 600 may include deactivating the first antenna based at least in part on the second event and at 610, the process 600 may include activating a second antenna based at least in part on the second event. For instance, based on detecting second event, the electronic device 402 may deactivate the first antenna and then activate the second antenna. In some examples, the second antenna may be included in a second group of antennas and the electronic device 402 may activate the second group of antennas. In some examples, the second antenna may be included in the first group of antennas. For instance, the electronic device 402 may be switching between activating and deactivating the first antenna and the second antenna.

At 612, the process 600 may include detecting a third event. For instance, the electronic device 402 may detect the third event. In some examples, the electronic device 402 detects the third event by detecting, using the sensor(s) 412, the object located at a third location relative to the electronic device 402. In some examples, the electronic device 402 detects the third event by determining that a period of time has elapsed since detecting the second event and/or activating the second antenna. Still, in some examples, the electronic device 402 detects the third event by receiving command data from the remote system(s).

At 614, the process 600 may include deactivating the second antenna based at least in part on the third event. For instance, based on detecting third event, the electronic device 402 may deactivate the second antenna. In some examples, such as when the second antenna may be included in the first group of antennas or the second group of antennas, the electronic device 402 may deactivate the first group of antennas or the second group of antennas.

Figure 7:
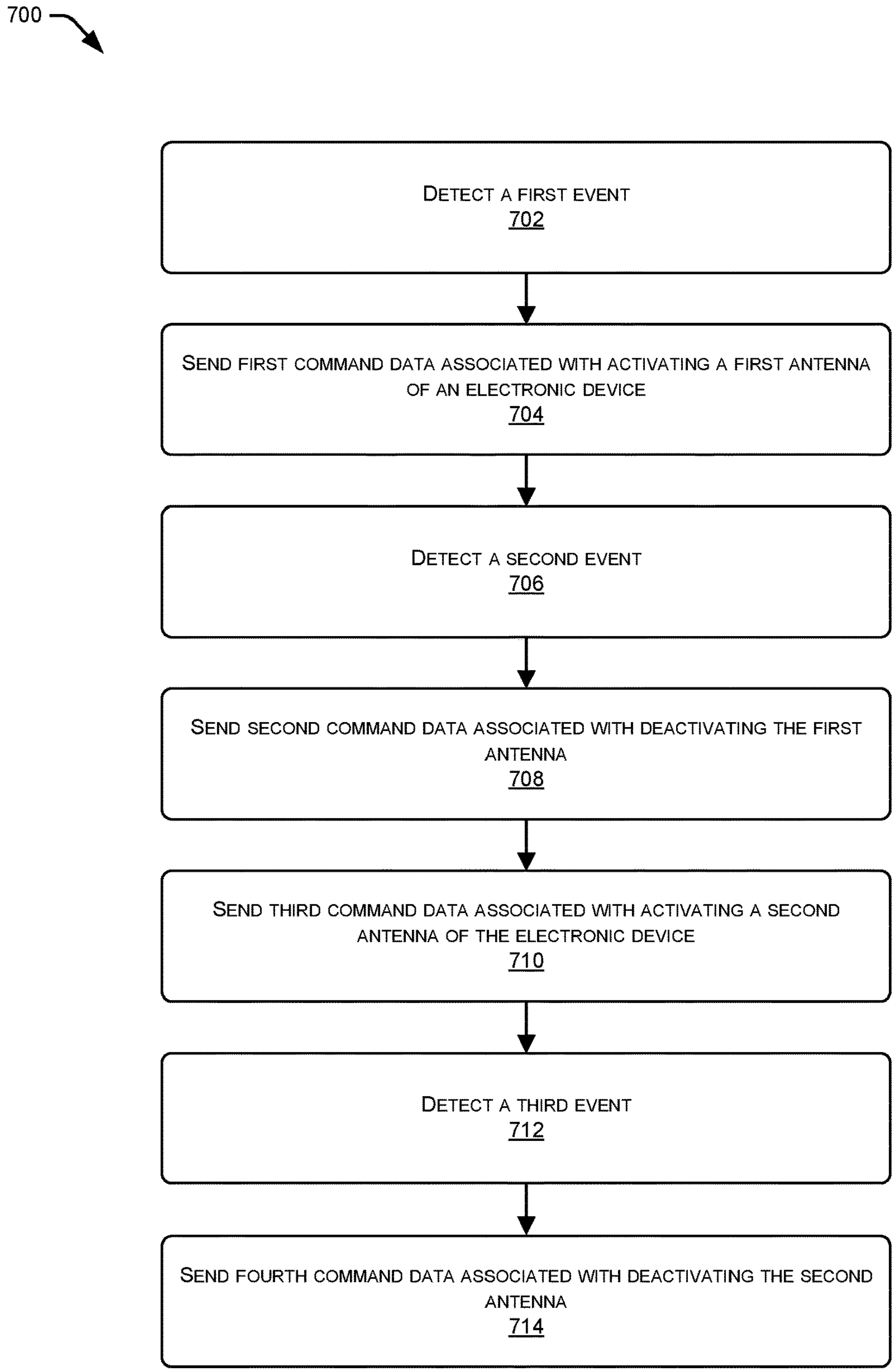
FIG. 7 illustrates an example process for remote system(s) that control an electronic device to deactivate tags, in accordance with examples of the present disclosure.

FIG. 7 illustrates another example process 700 for remote system(s) that control an electronic device to deactivate tags, in accordance with examples of the present disclosure. At 702, the process 700 may include detecting a first event. For instance, the remote system(s) may detect the first event. In some examples, the remote system(s) detect the first event by detecting, using the sensor(s), an object located at a first location relative to the electronic device 402. In some examples, the remote system(s) detect the first event by determining that a period of time has elapsed since a previous event.

At 704, the process 700 may include sending first command data associated with activating a first antenna of an electronic device. For instance, based on detecting the first event, the remote system(s) may send the first command data to the electronic device 402. In some examples, the first antenna may be included in a first group of antennas and the first command data may be for activating the first group of antennas.

At 706, the process 700 may include detecting a second event. For instance, the remote system(s) may detect the second event. In some examples, the remote system(s) detect the second event by detecting, using the sensor(s), the object located at a second location relative to the electronic device 402. In some examples, the remote system(s) detect the second event by determining that a period of time has elapsed since detecting the first event and/or sending the first command data.

At 708, the process 700 may include sending second command data associated with deactivating the first antenna and at 710, the process 700 may include sending third command data associated with activating a second antenna of the electronic device. For instance, based on detecting second event, the remote system(s) may send the second command data and the third command data to the electronic device 402. In some examples, the second antenna may be included in a second group of antennas and the third command data may be associated with activating the second group of antennas. In some examples, the second antenna may be included in the first group of antennas. For instance, the remote system(s) may cause the electronic device 402 to switch between activating and deactivating the first antenna and the second antenna.

At 712, the process 700 may include detecting a third event. For instance, the remote system(s) may detect the third event. In some examples, the remote system(s) detect the third event by detecting, using the sensor(s), the object located at a third location relative to the electronic device 402. In some examples, the remote system(s) detect the third event by determining that a period of time has elapsed since detecting the second event and/or sending the third command data.

At 714, the process 700 may include sending fourth command data associated with deactivating the second antenna. For instance, based on detecting third event, the electronic device 402 may send the fourth command data to the electronic device 402. In some examples, such as when the second antenna is included in the first group of antennas or second group of antennas, the fourth command data may be for deactivating the first group of antennas or the second group of antennas. In some examples, the remote system(s) may continue these processes of detecting events and then sending command data for activating and deactivating antennas of the electronic device 402.

Figure 8:
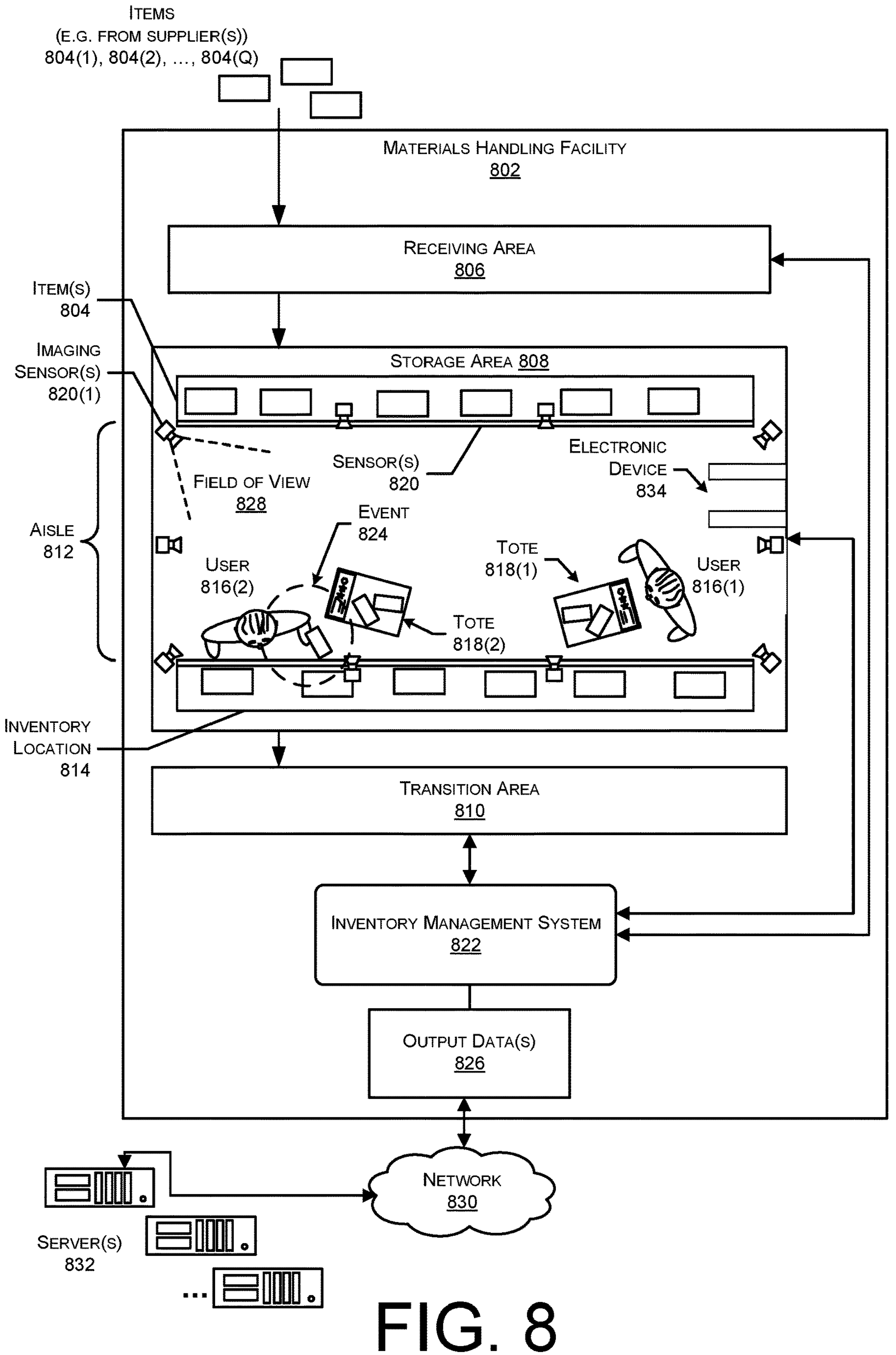
FIG. 8 is a block diagram of an example materials handling facility that includes sensors and an inventory management system configured to generate output regarding events occurring in the facility using the sensor data.
Figure 9:
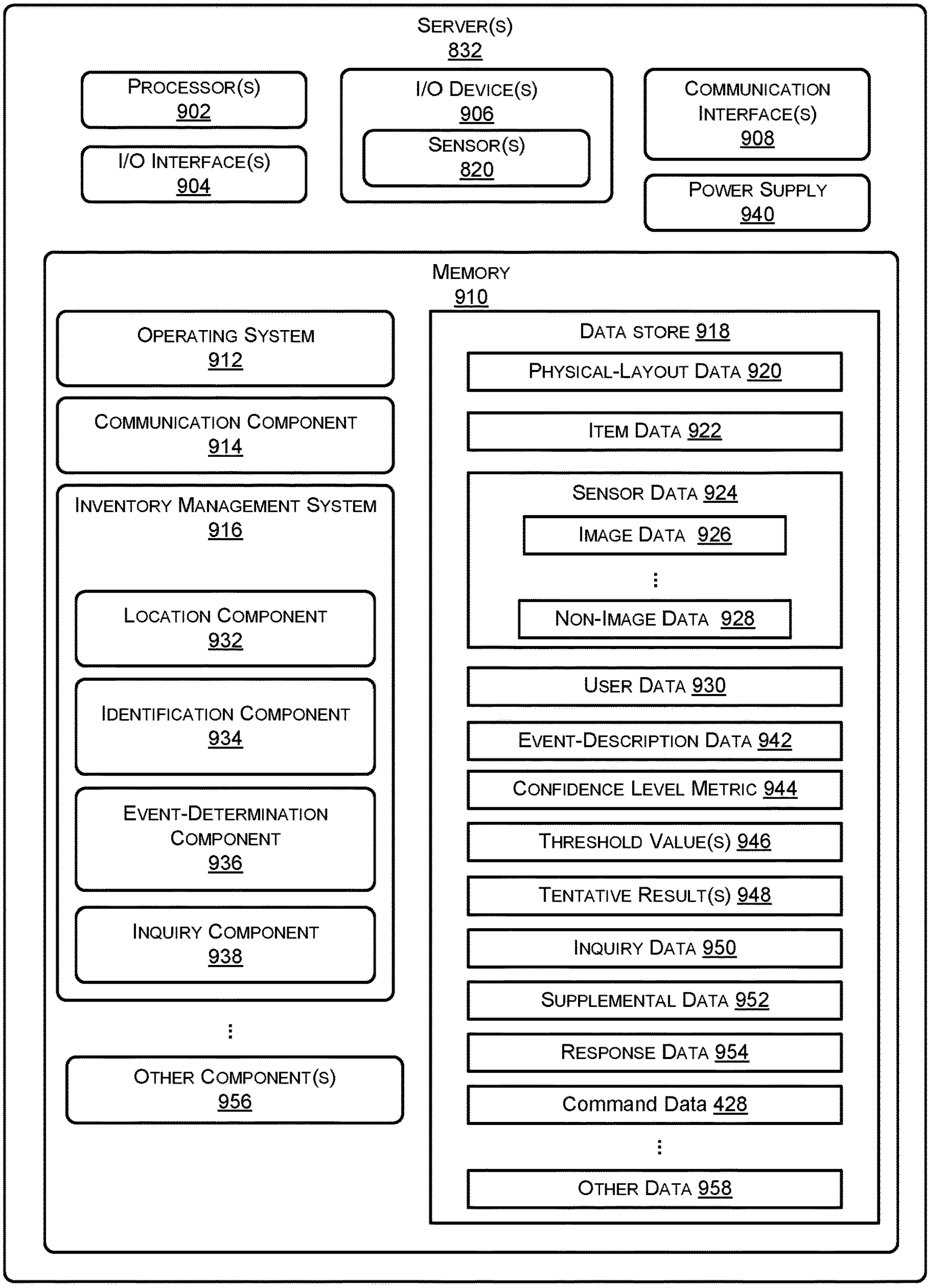
FIG. 9 illustrates a block diagram of one or more servers configured to support operation of the facility. As illustrated, the servers may include a checkout-eligibility component for determining whether a user is eligible to exit the facility with one or more picked items without performing a manual checkout of the items.

FIGS. 8 and 9 represent an illustrative materials handling environment, such as the materials handling facility 802, in which the techniques described herein may be applied to cameras monitoring the environments as described below. However, the following description is merely one illustrative example of an industry and environment in which the techniques described herein may be utilized. The materials handling facility 802 (or "facility") comprises one or more physical structures or areas within which one or more items 804(1), 804(2), . . . , 804(Q) (generally denoted as 804) may be held. As used in this disclosure, letters in parentheses such as "(Q)" indicate an integer result. The items 804 comprise physical goods, such as books, pharmaceuticals, repair parts, electronic gear, groceries, and so forth.

The facility 802 may include one or more areas designated for different functions with regard to inventory handling. In this illustration, the facility 802 includes a receiving area 806, a storage area 808, and a transition area 810. The receiving area 806 may be configured to accept items 804, such as from suppliers, for intake into the facility 802. For example, the receiving area 806 may include a loading dock at which trucks or other freight conveyances unload the items 804. Nice!

The storage area 808 is configured to store the items 804. The storage area 808 may be arranged in various physical configurations. In one implementation, the storage area 808 may include one or more aisles 812. The aisle 812 may be configured with, or defined by, inventory locations 814 on one or both sides of the aisle 812. The inventory locations 814 may include one or more of shelves, racks, cases, cabinets, bins, floor locations, or other suitable storage mechanisms for holding or storing the items 804. The inventory locations 814 may be affixed to the floor or another portion of the facility's structure, or may be movable such that the arrangements of aisles 812 may be reconfigurable. In some implementations, the inventory locations 814 may be configured to move independently of an outside operator. For example, the inventory locations 814 may comprise a rack with a power source and a motor, operable by a computing device to allow the rack to move from one location within the facility 802 to another.

One or more users 816(1), 816(2) (generally denoted as 816), totes 818(1), 818(2) (generally denoted as 818) or other material handling apparatus may move within the facility 802. For example, the users 816 may move about within the facility 802 to pick or place the items 804 in various inventory locations 814, placing them on the totes 818 for ease of transport. An individual tote 818 is configured to carry or otherwise transport one or more items 804. For example, a tote 818 may include a basket, a cart, a bag, and so forth. In other implementations, other agencies such as robots, forklifts, cranes, aerial drones, and so forth, may move about the facility 802 picking, placing, or otherwise moving the items 804.

One or more sensors 820 may be configured to acquire information in the facility 802. The sensors 820 in the facility 802 may include sensors fixed in the environment (e.g., ceiling-mounted cameras) or otherwise, such as sensors in the possession of users (e.g., mobile phones, tablets, etc.). The sensors 820 may include, but are not limited to, cameras 820(1), weight sensors, radio frequency (RF) receivers, temperature sensors, humidity sensors, vibration sensors, and so forth. The sensors 820 may be stationary or mobile, relative to the facility 802. For example, the inventory locations 814 may contain cameras 820(1) configured to acquire images of pick or placement of items 804 on shelves, of the users 816(1) and 816(2) in the facility 802, and so forth. In another example, the floor of the facility 802 may include weight sensors configured to determine a weight of the users 816 or another object thereupon.

During operation of the facility 802, the sensors 820 may be configured to provide information suitable for tracking how objects move or other occurrences within the facility 802. For example, a series of images acquired by a camera 820(1) may indicate removal of an item 804 from a particular inventory location 814 by one of the users 816 and placement of the item 804 on or at least partially within one of the totes 818.

While the storage area 808 is depicted as having one or more aisles 812, inventory locations 814 storing the items 804, sensors 820, and so forth, it is understood that the receiving area 806, the transition area 810, or other areas of the facility 802 may be similarly equipped. Furthermore, the arrangement of the various areas within the facility 802 is depicted functionally rather than schematically. For example, multiple different receiving areas 806, storage areas 808, and transition areas 810 may be interspersed rather than segregated in the facility 802.

The facility 802 may include, or be coupled to, an inventory management system 822, which may perform some or all of the techniques described above with reference to FIGS. 1-7. For example, the inventory management system 822 may maintain a virtual cart of each user within the facility. The inventory management system 822 may also store a record associated with each user indicating the location of the user, and whether the user is eligible to exit the facility with one or more items without performing a manual checkout of the items. The inventory management system 822 may also generate and output notification data to the users, indicating whether or not they are so eligible.

As illustrated, the inventory management system 822 may reside at the facility 802 (e.g., as part of on-premises servers), on the servers 832 that are remote from the facility 802, a combination thereof. In each instance, the inventory management system 822 is configured to identify interactions and events with and between users 816, devices such as sensors 820, robots, material handling equipment, computing devices, and so forth, in one or more of the receiving area 806, the storage area 808, or the transition area 810. As described above, some interactions may further indicate the existence of one or more events 824, or predefined activities of interest. For example, events 824 may include the entry of the user 816 to the facility 802, stocking of items 804 at an inventory location 814, picking of an item 804 from an inventory location 814, returning of an item 804 to an inventory location 814, placement of an item 804 within a tote 818, movement of users 816 relative to one another, gestures by the users 816, and so forth. Other events 824 involving users 816 may include the user 816 providing authentication information in the facility 802, using a computing device at the facility 802 to authenticate the user to the inventory management system 822, and so forth. Some events 824 may involve one or more other objects within the facility 802. For example, the event 824 may comprise movement within the facility 802 of an inventory location 814, such as a counter mounted on wheels. Events 824 may involve one or more of the sensors 820. For example, a change in operation of a sensor 820, such as a sensor failure, change in alignment, and so forth, may be designated as an event 824. Continuing the example, movement of a camera 820(1) resulting in a change in the orientation of the field of view 828 (such as resulting from someone or something bumping the camera 820(1)) may be designated as an event 824.

By determining the occurrence of one or more of the events 824, the inventory management system 822 may generate output data 826. The output data 826 comprises information about the event 824. For example, where the event 824 comprises an item 804 being removed from an inventory location 814, the output data 826 may comprise an item identifier indicative of the particular item 804 that was removed from the inventory location 814 and a user identifier of a user that removed the item.

The inventory management system 822 may use one or more automated systems to generate the output data 826. For example, an artificial neural network, one or more classifiers, or other automated machine learning techniques may be used to process the sensor data from the one or more sensors 820 to generate output data 826. For example, the inventory management system 822 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 826 or the tentative results. The automated systems may generate confidence level data that provides information indicative of the accuracy or confidence that the output data 826 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 98%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 804, user 816, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 816 may pick an item 804(1) such as a perfume bottle that is generally cubical in shape from the inventory location 814. Other items 804 at nearby inventory locations 814 may be predominantly spherical. Based on the difference in shape (cube vs. sphere) from the adjacent items, and the correspondence in shape with the previously stored image of the perfume bottle item 804(1) (cubical and cubical), the confidence level that the user has picked up the perfume bottle item 804(1) is high.

In some situations, the automated techniques may be unable to generate output data 826 with a confidence level above a threshold result. For example, the automated techniques may be unable to distinguish which user 816 in a crowd of users 816 has picked up the item 804 from the inventory location 814. In other situations, it may be desirable to provide human confirmation of the event 824 or of the accuracy of the output data 826. For example, some items 804 may be deemed age restricted such that they are to be handled only by users 816 above a minimum age threshold.

In instances where human confirmation is desired, sensor data associated with an event 824 may be processed to generate inquiry data. The inquiry data may include a subset of the sensor data associated with the event 824. The inquiry data may also include one or more of one or more tentative results as determined by the automated techniques, or supplemental data. The subset of the sensor data may be determined using information about the one or more sensors 820. For example, camera data such as the location of the camera 820(1) within the facility 802, the orientation of the camera 820(1), and a field of view 828 of the camera 820(1) may be used to determine if a particular location within the facility 802 is within the field of view 828. The subset of the sensor data may include images that may show the inventory location 814 or that the item 804 was stowed. The subset of the sensor data may also omit images from other cameras 820(1) that did not have that inventory location 814 in the field of view 828. The field of view 828 may comprise a portion of the scene in the facility 802 that the sensor 820 is able to generate sensor data about.

Continuing the example, the subset of the sensor data may comprise a video clip acquired by one or more cameras 820(1) having a field of view 828 that includes the item 804. The tentative results may comprise the "best guess" as to which items 804 may have been involved in the event 824. For example, the tentative results may comprise results determined by the automated system that have a confidence level above a minimum threshold.

The facility 802 may be configured to receive different kinds of items 804 from various suppliers and to store them until a customer orders or retrieves one or more of the items 804. A general flow of items 804 through the facility 802 is indicated by the arrows of FIG. 8. Specifically, as illustrated in this example, items 804 may be received from one or more suppliers, such as manufacturers, distributors, wholesalers, and so forth, at the receiving area 806. In various implementations, the items 804 may include merchandise, commodities, perishables, or any suitable type of item 804, depending on the nature of the enterprise that operates the facility 802. The receiving of the items 804 may comprise one or more events 824 for which the inventory management system 822 may generate output data 826.

Upon being received from a supplier at receiving area 806, the items 804 may be prepared for storage. For example, items 804 may be unpacked or otherwise rearranged. The inventory management system 822 may include one or more software applications executing on a computer system to provide inventory management functions based on the events 824 associated with the unpacking or rearrangement. These inventory management functions may include maintaining information indicative of the type, quantity, condition, cost, location, weight, or any other suitable parameters with respect to the items 804. The items 804 may be stocked, managed, or dispensed in terms of countable, individual units or multiples, such as packages, cartons, crates, pallets, or other suitable aggregations. Alternatively, some items 804, such as bulk products, commodities, and so forth, may be stored in continuous or arbitrarily divisible amounts that may not be inherently organized into countable units. Such items 804 may be managed in terms of measurable quantity such as units of length, area, volume, weight, time, duration, or other dimensional properties characterized by units of measurement. Generally speaking, a quantity of an item 804 may refer to either a countable number of individual or aggregate units of an item 804 or a measurable amount of an item 804, as appropriate.

After arriving through the receiving area 806, items 804 may be stored within the storage area 808. In some implementations, like items 804 may be stored or displayed together in the inventory locations 814 such as in bins, on shelves, hanging from pegboards, and so forth. In this implementation, all items 804 of a given kind are stored in one inventory location 814. In other implementations, like items 804 may be stored in different inventory locations 814. For example, to optimize retrieval of certain items 804 having frequent turnover within a large physical facility 802, those items 804 may be stored in several different inventory locations 814 to reduce congestion that might occur at a single inventory location 814. Storage of the items 804 and their respective inventory locations 814 may comprise one or more events 824.

When a customer order specifying one or more items 804 is received, or as a user 816 progresses through the facility 802, the corresponding items 804 may be selected or "picked" from the inventory locations 814 containing those items 804. In various implementations, item picking may range from manual to completely automated picking. For example, in one implementation, a user 816 may have a list of items 804 they desire and may progress through the facility 802 picking items 804 from inventory locations 814 within the storage area 808, and placing those items 804 into a tote 818. In other implementations, employees of the facility 802 may pick items 804 using written or electronic pick lists derived from customer orders. These picked items 804 may be placed into the tote 818 as the employee progresses through the facility 802. Picking may comprise one or more events 824, such as the user 816 in moving to the inventory location 814, retrieval of the item 804 from the inventory location 814, and so forth.

After items 804 have been picked, they may be processed at a transition area 810. The transition area 810 may be any designated area within the facility 802 where items 804 are transitioned from one location to another or from one entity to another. For example, the transition area 810 may be a packing station within the facility 802. When the item 804 arrives at the transition area 810, the items 804 may be transitioned from the storage area 808 to the packing station. The transitioning may comprise one or more events 824. Information about the transition may be maintained by the inventory management system 822 using the output data 826 associated with those events 824.

In another example, if the items 804 are departing the facility 802 a list of the items 804 may be obtained and used by the inventory management system 822 to transition responsibility for, or custody of, the items 804 from the facility 802 to another entity. For example, a carrier may accept the items 804 for transport with that carrier accepting responsibility for the items 804 indicated in the list. In another example, a customer may purchase or rent the items 804 and remove the items 804 from the facility 802. The purchase or rental may comprise one or more events 824.

The inventory management system 822 may access or generate sensor data about the facility 802 and the contents therein including the items 804, the users 816, the totes 818, and so forth. The sensor data may be acquired by one or more of the sensors 820, data provided by other systems, and so forth. For example, the sensors 820 may include cameras 820(1) configured to acquire image data of scenes in the facility 802. The image data may comprise still images, video, or a combination thereof. The image data may be processed by the inventory management system 822 to determine a location of the user 816, the tote 818, the identifier of the user 816, and so forth. As used herein, the identity of the user may represent a unique identifier of the user (e.g., name, number associated with user, username, etc.), an identifier that distinguishes the user amongst other users being located within the environment, or the like.

The inventory management system 822, or systems coupled thereto, may be configured to associate an account with the user 816, as well as to determine other candidate users. An account of the user 816 may be determined before, during, or after entry to the facility 802.

In some instances, the inventory management system 822 groups users within the facility into respective sessions. That is, the inventory management system 822 may utilize the sensor data to determine groups of users that are effectively "together" (e.g., shopping together). In some instances, a particular session may include multiple users that entered the facility 802 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 818. Noting the child and the mother as belonging to the same session may increase the chances of successfully adding the box of cereal to the virtual shopping cart of the mother.

By determining the occurrence of one or more events 824 and the output data 826 associated therewith, the inventory management system 822 is able to provide one or more services to the users 816 of the facility 802. By utilizing one or more facility associates to process inquiry data and generate response data that may then be used to produce output data 826, overall accuracy of the system may be enhanced. The enhanced accuracy may improve the user experience of the one or more users 816 of the facility 802. In some examples, the output data 826 may be transmitted over a network 830 to one or more servers 832 (e.g., remote system(s)).

As further illustrated in FIG. 8, the facility 802 may include one or more electronic device 834 (although one is only illustrated for clarity reasons) for deactivating tags associated with items 804. The electronic device(s) 834 may include, and/or be similar to, to the electronic device 102, the electronic device 302, and/or the electronic device 402. In some examples, the electronic device(s) 834 may be configured to communicate with the server(s) 832 over the network 830. For instance, the electronic device(s) 834 may be configured to send and receive data with the servers) 832 over the network 830.

FIG. 9 illustrates a block diagram of the server(s) 832. The server(s) 832 may be physically present at the facility 802, may be accessible by the network 830, or a combination of both. The server(s) 832 do not require end-user knowledge of the physical location and configuration of the system that delivers the services. Common expressions associated with the server(s) 832 may include "on-demand computing," "software as a service (SaaS)," "cloud services," "data centers," "remote system(s)", and so forth. Services provided by the server(s) 832 may be distributed across one or more physical or virtual devices.

The server(s) 832 may include one or more hardware processors 902 (processors) configured to execute one or more stored instructions. The processor(s) 902 may comprise one or more cores. The server(s) 832 may include one or more input/output (I/O) interfaces 904 to allow the processor 902 or other portions of the server(s) 832 to communicate with other devices. The I/O interface(s) 904 may comprise Inter-Integrated Circuit (I2C), Serial Peripheral Interface bus (SPI), Universal Serial Bus (USB) as promulgated by the USB Implementers Forum, and so forth.

The server(s) 832 may also include one or more communication interfaces 908. The communication interface(s) 908 are configured to provide communications between the server(s) 832 and other devices, such as the sensors 820, the interface devices, routers, the electronic device 832, and so forth. The communication interface(s) 908 may include devices configured to couple to personal area networks (PANs), wired and wireless local area networks (LANs), wired and wireless wide area networks (WANs), and so forth. For example, the communication interface(s) 908 may include devices compatible with Ethernet, Wi-Fi™, and so forth. The server(s) 832 may also include one or more busses or other internal communications hardware or software that allow for the transfer of data between the various modules and components of the servers 832.

The server(s) 832 may also include a power supply 908. The power supply 940 is configured to provide electrical power suitable for operating the components in the server(s) 832.

The server(s) 832 may further include one or more memories 910. The memory 910 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 910 provides storage of computer-readable instructions, data structures, program modules, and other data for the operation of the servers 832. A few example functional modules are shown stored in the memory 910, although the same functionality may alternatively be implemented in hardware, firmware, or as a system on a chip (SOC).

The memory 910 may include at least one operating system (OS) component 912. The OS component 912 is configured to manage hardware resource devices such as the I/O interface(s) 904, the communication interface(s) 908, and provide various services to applications or components executing on the processor(s) 902. The OS component 912 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following components may also be stored in the memory 910. These components may be executed as foreground applications, background tasks, daemons, and so forth. A communication component(s) 914 may be configured to establish communications with one or more of the sensors 820, one or more of the devices used by associates, other server(s) 832, or other devices. The communications may be authenticated, encrypted, and so forth.

The memory 910 may store an inventory management system 916. The inventory management system 916 is configured to provide the inventory functions as described herein with regard to the inventory management system 822. For example, the inventory management system 916 may track movement of items 804 in the facility 802, generate user interface data, and so forth.

The inventory management system 916 may access information stored in one or more data stores 918 in the memory 910. The data store(s) 918 may use a flat file, database, linked list, tree, executable code, script, or other data structure to store the information. In some implementations, the data store(s) 918 or a portion of the data store(s) 918 may be distributed across one or more other devices including other servers 832, network attached storage devices, and so forth.

The data store(s) 918 may include physical layout data 920. The physical layout data 920 provides a mapping of physical locations within the physical layout of devices and objects such as the sensors 820, inventory locations 814, and so forth. The physical layout data 920 may indicate the coordinates within the facility 802 of an inventory location 814, sensors 820 within view of that inventory location 814, and so forth. For example, the physical layout data 920 may include camera data comprising one or more of a location within the facility 802 of a camera 820(1), orientation of the camera 820(1), the operational status, and so forth. Continuing example, the physical layout data 920 may indicate the coordinates of the camera 820(1), pan and tilt information indicative of a direction that the field of view 828 is oriented along, whether the camera 820(1) is operating or malfunctioning, and so forth.

In some implementations, the inventory management system 916 may access the physical layout data 920 to determine if a location associated with the event 824 is within the field of view 828 of one or more sensors 820. Continuing the example above, given the location within the facility 802 of the event 824 and the camera data, the inventory management system 916 may determine the cameras 820(1) that may have generated images of the event 824.

The item data 922 comprises information associated with the items 804. The information may include information indicative of one or more inventory locations 814 at which one or more of the items 804 are stored. The item data 922 may also include order data, SKU or other product identifier, price, quantity on hand, weight, expiration date, images of the item 804, detail description information, ratings, ranking, and so forth. The inventory management system 916 may store information associated with inventory management functions in the item data 922.

The data store(s) 918 may also include sensor data 924. The sensor data 924 comprises information acquired from, or based on, the one or more sensors 820. For example, the sensor data 924 may comprise 3D information about an object in the facility 802. As described above, the sensors 820 may include a camera 820(1), which is configured to acquire one or more images. These images may be stored as the image data 926. The image data 926 may comprise information descriptive of a plurality of picture elements or pixels. Non-image data 928 may comprise information from other sensors 820, such as input from microphones, weight sensors, and so forth.

User data 930 may also be stored in the data store(s) 918. The user data 930 may include identity data, information indicative of a profile, purchase history, location data, and so forth. Individual users 816 or groups of users 816 may selectively provide user data 930 for use by the inventory management system 822. The individual users 816 or groups of users 816 may also authorize collection of the user data 930 during use of the facility 802 or access to user data 930 obtained from other systems. For example, the user 816 may opt-in to collection of the user data 930 to receive enhanced services while using the facility 802.

In some implementations, the user data 930 may include information designating a user 816 for special handling. For example, the user data 930 may indicate that a particular user 816 has been associated with an increased number of errors with respect to output data 826. The inventory management system 916 may be configured to use this information to apply additional scrutiny to the events 824 associated with this user 816. For example, events 824 that include an item 804 having a cost or result above the threshold amount may be provided to a facility associate for processing regardless of the determined level of confidence in the output data 826 as generated by the automated system.

The inventory management system 916 may include one or more of a location component 932, identification component 934, event-determination component 936, and inquiry component 938, potentially amongst other components 956.

The location component 932 functions to locate items or users within the environment of the facility to allow the inventory management system 916 to assign certain events to the correct users. That is, the location component 932 may assign unique identifiers to users as they enter the facility and, with the users' consent, may locate the users throughout the facility 802 over the time they remain in the facility 802. The location component 932 may perform this locating using sensor data 924, such as the image data 926. For example, the location component 932 may receive the image data 926 and may use techniques to identify users from the images. After identifying a particular user within the facility, the location component 932 may then locate the user within the images as the user moves throughout the facility 802. Further, should the location component 932 temporarily "lose" a particular user, the location component 932 may again attempt to identify the users within the facility based on techniques.

Therefore, upon receiving the indication of the time and location of the event in question, the location component 932 may query the data store 918 to determine which one or more users were at or within a threshold distance of the location of the event at the particular time of the event. Further, the location component 932 may assign different confidence levels to different users, with the confidence levels indicating how likely it is that each corresponding user is the user that is in fact associated with the event of interest.

The location component 932 may access the sensor data 924 in order to determine this location data of the user and/or items. The location data provides information indicative of a location of an object, such as the item 804, the user 816, the tote 818, and so forth. The location may be absolute with respect to the facility 802 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 802, 5.2 m from an inventory location 814 along a heading of 169°, and so forth. For example, the location data may indicate that the user 816(1) is 25.2 m along the aisle 812(1) and standing in front of the inventory location 814. In comparison, a relative location may indicate that the user 816(1) is 32 cm from the tote 818 at a heading of 73° with respect to the tote 818. The location data may include orientation information, such as which direction the user 816 is facing. The orientation may be determined by the relative direction the user's 816 body is facing. In some implementations, the orientation may be relative to the interface device. Continuing the example, the location data may indicate that the user 816(1) is oriented with a heading of 0°, or looking north. In another example, the location data may indicate that the user 816 is facing towards the interface device.

The identification component 934 is configured to identify an object. In one implementation, the identification component 934 may be configured to identify an item 804. In another implementation, the identification component 934 may be configured to identify the user 816. For example, the identification component 934 may use facial recognition techniques to process the image data 926 and determine the user 816 depicted in the images by comparing the characteristics in the image data 926 with previously stored results. The identification component 934 may also access data from other sensors 820, such as from an RFID reader, an RF receiver, and so forth.

The event-determination component 936 is configured to process the sensor data 924 and generate output data 826, and may include components described above. The event-determination component 936 may access information stored in the data store(s) 918 including, but not limited to, event-description data 942, confidence levels 944, or threshold values 946. In some instances, the event-determination component 936 may be configured to perform some or all of the techniques described above with regards to the event-determination component 936. For instance, the event-determination component 936 may be configured to create and utilize event classifiers for identifying events (e.g., predefined activity) within image data, potentially without use of other sensor data acquired by other sensors in the environment.

The event-description data 942 comprises information indicative of one or more events 824. For example, the event-description data 942 may comprise predefined profiles that designate movement of an item 804 from an inventory location 814 with the event 824 of "pick". The event-description data 942 may be manually generated or automatically generated. The event-description data 942 may include data indicative of triggers associated with events occurring in the facility 802. An event may be determined as occurring upon detection of the trigger. For example, sensor data 924 such as a change in weight from a weight sensor 820 at an inventory location 814 may trigger detection of an event of an item 804 being added or removed from the inventory location 814. In another example, the trigger may comprise an image of the user 816 reaching a hand toward the inventory location 814. In yet another example, the trigger may comprise two or more users 816 approaching to within a threshold distance of one another.

The event-determination component 936 may process the sensor data 924 using one or more techniques including, but not limited to, artificial neural networks, classifiers, decision trees, support vector machines, Bayesian networks, and so forth. For example, the event-determination component 936 may use a decision tree to determine occurrence of the "pick" event 824 based on sensor data 924. The event-determination component 936 may further use the sensor data 924 to determine one or more tentative results 948. The one or more tentative results 948 comprise data associated with the event 824. For example, where the event 824 comprises a disambiguation of users 816, the tentative results 948 may comprise a list of possible user 816 identities. In another example, where the event 824 comprises a disambiguation between items, the tentative results 948 may comprise a list of possible item identifiers. In some implementations, the tentative result 948 may indicate the possible action. For example, the action may comprise the user 816 picking, placing, moving an item 804, damaging an item 804, providing gestural input, and so forth.

In some implementations, the tentative results 948 may be generated by other components. For example, the tentative results 948 such as one or more possible identities or locations of the user 816 involved in the event 824 may be generated by the location component 932. In another example, the tentative results 948 such as possible items 804 that may have been involved in the event 824 may be generated by the identification component 934.

The event-determination component 936 may be configured to provide a confidence level 944 associated with the determination of the tentative results 948. The confidence level 944 provides indicia as to the expected level of accuracy of the tentative result 948. For example, a low confidence level 944 may indicate that the tentative result 948 has a low probability of corresponding to the actual circumstances of the event 824. In comparison, a high confidence level 944 may indicate that the tentative result 948 has a high probability of corresponding to the actual circumstances of the event 824.

In some implementations, the tentative results 948 having confidence levels 944 that exceed the threshold may be deemed to be sufficiently accurate and thus may be used as the output data 956. For example, the event-determination component 936 may provide tentative results 948 indicative of the three possible items 804(1), 804(2), and 804(3) corresponding to the "pick" event 824. The confidence levels 944 associated with the possible items 804(1), 804(2), and 804(3) may be 25%, 70%, 92%, respectively. Continuing the example, the threshold value 946 may be set such that confidence level 944 of 90% are deemed to be sufficiently accurate. As a result, the event-determination component 936 may designate the "pick" event 824 as involving item 804(3).

The inquiry component 938 may be configured to use at least a portion of the sensor data 924 associated with the event 824 to generate inquiry data 950. In some implementations, the inquiry data 950 may include one or more of the tentative results 948 or supplemental data 952. The inquiry component 938 may be configured to provide inquiry data 950 to one or more devices associated with one or more human associates.

An associate user interface is presented on the respective devices of associates. The associate may generate response data 954 by selecting a particular tentative result 948, entering new information, indicating that they are unable to answer the inquiry, and so forth.

The supplemental data 952 comprises information associated with the event 824 or that may be useful in interpreting the sensor data 924. For example, the supplemental data 952 may comprise previously stored images of the items 804. In another example, the supplemental data 952 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 926 during presentation to an associate.

The inquiry component 938 processes the response data 954 provided by the one or more associates. The processing may include calculating one or more statistical results associated with the response data 954. For example, statistical results may include a count of the number of times associates selected a particular tentative result 948, determination of a percentage of the associates that selected a particular tentative result 948, and so forth.

The inquiry component 938 is configured to generate the output data 956 based at least in part on the response data 954. For example, given that a majority of the associates returned response data 954 indicating that the item 804 associated with the "pick" event 824 is item 804(5), the output data 826 may indicate that the item 804(5) was picked.

The inquiry component 938 may be configured to selectively distribute inquiries to particular associates. For example, some associates may be better suited to answering particular types of inquiries. Performance data, such as statistical data about the performance of the associates, may be determined by the inquiry component 938 from the response data 954 provided by the associates. For example, information indicative of a percentage of different inquiries in which the particular associate selected response data 954 that disagreed with the majority of associates may be maintained. In some implementations, test or practice inquiry data 950 having a previously known correct answer may be provided to the associate for training or quality assurance purposes. The determination of the set of associates to use may be based at least in part on the performance data.

By using the inquiry component 938, the event-determination component 936 may be able to provide high reliability output data 956 that accurately represents the event 824. The output data 956 generated by the inquiry component 938 from the response data 954 may also be used to further train the automated systems used by the inventory management system 916. For example, the sensor data 924 and the output data 956, based on response data 954, may be provided to one or more of the components of the inventory management system 916 for training in process improvement. Continuing the example, this information may be provided to an artificial neural network, Bayesian network, and so forth, to further train these systems such that the confidence level 944 and the tentative results 948 produced in the future for the same or similar input is improved. Finally, as FIG. 9 illustrates, the server(s) 832 may store and/or utilize other data 958.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A checkpoint comprising:

a first gate comprising:

a first antenna for deactivating a tag when activated;

a second antenna for deactivating the tag when activated:

a third antenna for deactivating the tag when activated;

a fourth antenna for deactivating the tag when activated;

a fifth antenna for deactivating the tag when activated;

a sixth antenna for deactivating the tag when activated:

one or more motion sensors;

one or more processors; and one or more non-transitory computer-readable media storing instructions that, when executed by the one or more processors, cause the checkpoint to perform operations comprising:

generating first sensor data using the one or more motion sensors;

determining, based at least in part on the first sensor data, that an object is located at a first location relative to the checkpoint;

based at least in part on the object being located at the first location, causing the first antenna to activate;

based at least in part on the object being located at the first location, causing the fourth antenna to activate;

generating second sensor data using the one or more motion sensors;

determining, based at least in part on the second sensor data, that the object is located at a second location relative to the checkpoint;

based at least in part on the object being located at the second location:

causing the first antenna to deactivate;

causing the second antenna to activate;

causing the fourth antenna to deactivate; and causing the fifth antenna to activate;

generating third sensor data using the one or more motion sensors;

determining, based at least in part on the third sensor data, that the object is located at a third location relative to the checkpoint; and based at least in part on the object being location at the third location:

causing the second antenna to deactivate;

causing the third antenna to activate;

causing the fifth antenna to deactivate; and causing the sixth antenna to activate.

2. The checkpoint as recited in claim 1, wherein:

the first antenna is located a first distance from a side of the checkpoint and oriented in a first direction;

the second antenna is located a second distance from the side of the checkpoint and oriented in a second direction; and the third antenna is located a third distance from the side of the checkpoint and oriented in a third direction.

3. An electronic device comprising:

a first transmitter comprising a first antenna and a third antenna that deactivate a tag when activated;

a second transmitter comprising a second antenna and a fourth antenna that deactivate the tag when activated;

one or more processors; and one or more non-transitory computer-readable media storing instructions that, when executed by the one or more processors, cause the electronic device to perform operations comprising:

determining that an object is located at a first location relative to the electronic device;

based at least in part on the object being located at the first location, causing the first antenna and the third antenna to activate using a first phase during a first period of time and causing the first antenna and the third antenna to activate using a second phase during a second period of time;

determining that the object is located at a second location relative to the electronic device; and based at least in part on the object being located at the second location:

causing the first antenna to deactivate; and causing the second antenna and the fourth antenna to activate using a third phase during a third period of time and causing the second antenna and the fourth antenna to activate using a fourth phase during a fourth period of time.

4. The electronic device as recited in claim 3, further comprising:

a third antenna, and wherein the operations further comprise:

determining that the object is located at a third location relative to the electronic device; and based at least in part on the object being located at the third location, causing the third antenna to activate.

5. The electronic device as recited in claim 3, further comprising:

a first gate, the first gate including the first antenna and the second antenna;

a third antenna for deactivating the tag;

a fourth antenna for deactivating the tag; and a second gate, the second gate including the third antenna and the fourth antenna, and wherein the operations further comprise:
based at least in part on the object being located at the first location, causing the third antenna to activate; and
based at least in part on the object being located at the second location, causing the fourth antenna to activate.

6. The electronic device as recited in claim 3, further comprising:
a first gate, the first gate including the first antenna and the second antenna;
a third antenna for deactivating the tag;
a fourth antenna for deactivating the tag; and
a second gate, the second gate including the third antenna and the fourth antenna,
and wherein the operations further comprise:
determining that a first period of time has elapsed since causing the first antenna to activate;
based at least in part on the first period of time elapsing causing the third antenna to activate;
determining that a second period of time has elapsed since causing the second antenna to activate; and
based at least in part on the second period of time elapsing causing the fourth antenna to activate.

7. The electronic device as recited in claim 3, further comprising:
one or more motion sensors,
and wherein the operations further comprise:
generating first sensor data using the one or more sensors, wherein determining that the object is located at the first location is based at least in part on the first sensor data; and
generating second sensor data using the one or more sensors, wherein determining that the object is located at the second location is based at least in part on the second sensor data.

8. The electronic device as recited in claim 3, further comprising:
a first motion sensor; and
a second motion sensor,
and wherein the operations further comprise:
generating first sensor data using the first motion sensor;
determining, based at least in part on the first sensor data, that the first motion sensor detected the object, wherein determining that the object is located at the first location is based at least in part on determining that the first motion sensor detected the object;
generating second sensor data using the second motion sensor; and
determining, based at least in part on the second sensor data, that the second motion sensor detected the object, wherein determining that the object is located at the second location is based at least in part on determining that the second motion sensor detected the object.

9. The electronic device as recited in claim 3, the operations further comprising:
determining that a period of time has elapsed since at least one of determining that the object was located at the second location or causing the second antenna to activate; and
based at least in part on the period of time elapsing, causing the second antenna to deactivate.

10. The electronic device as recited in claim 3, further comprising:
a first side;
a second side that is opposite to the first side;
a third side; and
a fourth side that is opposite to the third side,
and wherein:
the first antenna is located a first distance from the first side and a second distance from the third side;
the second antenna is located a third distance from the first side and a fourth distance from the third side;
the third distance is greater than the first distance; and
the fourth distance is greater than the second distance.

11. The electronic device as recited in claim 3, wherein:
the first antenna is orientated in a first direction; and
the second antenna is orientated in a second direction that is different than the first direction.

12. The electronic device as recited in claim 3, wherein:
causing the first antenna to activate comprises, based at least in part on the object being located at the first location, causing the first antenna to activate using an amount of power; and
causing the second antenna to activate comprises, based at least in part on the object being located at the second location, causing the second antenna to activate using the amount of power.

13. The electronic device as recited in claim 3, further comprising:
a first motor associated with the first antennas; and
a second motor associated with the second antenna,
and wherein the operations further comprise:
while the first antenna is activated, causing the first motor to move the first antenna from being oriented in a first direction to being oriented in a second direction; and
while the second antenna is activated, causing the second motor to move the second antenna from being oriented in a third direction to being oriented in a fourth direction.

14. The electronic device as recited in claim 3, the operations further comprising:
determining that an additional object is located at the first location relative to the electronic device; and
based at least in part on the additional object being located at the first location:
causing the second antenna to deactivate; and
causing the first antenna to again activate.

15. The electronic device as recited in claim 3, wherein the object was located at the first location at a first time, and wherein the operations further comprise:
determining that the object is again located at the first location at a second time; and
based at least in part on the object being again located at the first location, causing the second antenna to deactivate.

16. A method comprising:
determining that an object is located at a first location with respect to an electronic device;
based at least in part on the object being located at the first location:
causing a first antenna of a first gate of the electronic device to activate, the first antenna for deactivating a tag when activated; and
causing a second antenna of a second gate of the electronic device to activate, the second antenna deactivating the tag when activated;
determining that the object is located at a second location with respect to the electronic device; and
based at least in part on the object being located at the second location:

causing a third antenna of the first gate to activate, the third antenna for deactivating the tag when activated; and causing a fourth antenna of the second gate to activate, the fourth antenna for deactivating the tag when activated;

determining that a first period of time has elapsed since the activating of the first antenna and the second antenna;

based at least in part on the first period of time elapsing:

deactivating the first antenna; and deactivating the second antenna;

determining that a second period of time has elapsed since the activating of the third antenna and the fourth antenna; and based at least in part on the second period of time elapsing:

deactivating the third antenna; and deactivating the fourth antenna.

17. The method as recited in claim 16, further comprising, based at least in part on the object being located at the second location:

causing the first antenna to deactivate; and causing the second antenna to deactivate.

18. An electronic device comprising:

a first antenna that deactivates a tag when activated;

a second antenna that deactivates the tag when activated;

one or more processors; and one or more non-transitory computer-readable media storing instructions that, when executed by the one or more processors, cause the electronic device to perform operations comprising:

determining that an object is located at a first location relative to the electronic device at a first time;

based at least in part on the object being located at the first location, causing the first antenna to activate using a first phase during a first period of time and causing the first antenna to activate using a second phase during a second period of time;

determining that the object is located at a second location relative to the electronic device at a second time, the second time later than the first time; and based at least in part on the object being located at the second location:

causing the first antenna to deactivate; and causing the second antenna to activate using a third phase during a third period of time and causing the second antenna to activate using a fourth phase during a fourth period of time.

19. A method comprising:

determining that an object is located at a first location with respect to an electronic device at a first time;

based at least in part on the object being located at the first location:

causing a first antenna of a first gate of the electronic device to activate using a first phase during a first period of time, the first antenna configured to deactivate a tag when activated; and causing the first antenna to activate using a second phase during a second period of time;

determining that the object is located at a second location with respect to the electronic device at a second time, the second time later than the first time; and based at least in part on the object being located at the second location:

causing the first antenna to deactivate;

causing a second antenna of a second gate of the electronic device to activate using a third phase during a third period of time; and causing the second antenna to activate using a fourth phase during a fourth period of time.

20. A method comprising:

causing a first antenna of the electronic device to activate using a first phase during a first period of time, the first antenna configured to deactivate a tag when activated;

causing the first antenna to activate using a second phase during a second period of time;

determining that the object is located at a second location with respect to the electronic device at a second time, the second time later than the first time;

causing the first antenna to deactivate at the second time;

causing a second antenna of the electronic device to activate using a third phase during a third period of time; and causing the second antenna to activate using a fourth phase during a fourth period of time.

21. An electronic device comprising:

a first antenna that interacts with a tag;

a second antenna that interacts with the tag;

one or more processors; and one or more non-transitory computer-readable media storing instructions that, when executed by the one or more processors, cause the electronic device to perform operations comprising:

determining that an object is located at a first location relative to the electronic device at a first time;

based at least in part on the object being located at the first location, causing the first antenna to activate with a first signal during a first period of time and causing the first antenna to activate with a second signal during a second period of time;

determining that the object is located at a second location relative to the electronic device at a second time, the second time later than the first time; and based at least in part on the object being located at the second location:

causing the first antenna to deactivate; and causing the second antenna to activate using a third signal during a third period of time and causing the second antenna to activate using a fourth signal during a fourth period of time.

* * * * *